United States Patent
Owechko et al.

(10) Patent No.: US 7,587,064 B2
(45) Date of Patent: Sep. 8, 2009

(54) ACTIVE LEARNING SYSTEM FOR OBJECT FINGERPRINTING

(75) Inventors: Yuri Owechko, Newbury Park, CA (US); Swarup Medasani, Thousand Oaks, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 132 days.

(21) Appl. No.: 11/051,860

(22) Filed: Feb. 3, 2005

(65) Prior Publication Data

US 2005/0169529 A1 Aug. 4, 2005

Related U.S. Application Data

(60) Provisional application No. 60/541,554, filed on Feb. 3, 2004.

(51) Int. Cl.
 *G06K 9/00* (2006.01)
 *G06K 9/62* (2006.01)
(52) U.S. Cl. ..................... 382/103; 382/159
(58) Field of Classification Search ............... 382/159
 See application file for complete search history.

(56) References Cited

U.S. PATENT DOCUMENTS

| | | | |
|---|---|---|---|
| 5,034,986 A * | 7/1991 | Karmann et al. ......... | 382/103 |
| 5,093,869 A * | 3/1992 | Alves et al. ............ | 382/199 |
| 6,456,991 B1 | 9/2002 | Srinivasa et al. | |
| 6,937,744 B1 * | 8/2005 | Toyama ................. | 382/103 |
| 2003/0204384 A1 * | 10/2003 | Owechko et al. ......... | 703/1 |

OTHER PUBLICATIONS

Papageorgiou et al. "A General Framework for Object Detection" Sixth International Conference on Computer Vision, Jan. 4-7, 1998 pp. 555-562.*

Medasani et al. "A fuzzy approach to content-based image retrieval" Fuzzy Systems Conference Proceedings, Aug. 22-25, 1999, pp. 1251-1260.*

Srinivasa et al. "Learning and Generalization of Noisy Mappings Using a Modified PROBART Neural Network" IEEE Transactions on Signal Processing, Oct. 1997, vol. 45 No. 10, pp. 2533-2550.*

Medasani et al "A fuzzy approach to content-based image retrieval" Fuzzy Systems Conference Proceedings, Aug. 22-25, 1999, pp. 964-968.*

(Continued)

*Primary Examiner*—Charles Kim
(74) *Attorney, Agent, or Firm*—Tope-McKay & Associates

(57) ABSTRACT

Described is an active learning system for fingerprinting an object identified in an image frame. The active learning system comprises a flow-based object segmentation module for segmenting a potential object candidate from a video sequence, a fixed-basis function decomposition module using Haar wavelets to extract a relevant feature set from the potential object candidate, a static classifier for initial classification of the potential object candidate, an incremental learning module for predicting a general class of the potential object candidate, an oriented localized filter module to extract features from the potential object candidate, and a learning-feature graph-fingerprinting module configured to receive the features and build a fingerprint of the object for tracking the object.

36 Claims, 30 Drawing Sheets
(21 of 30 Drawing Sheet(s) Filed in Color)

OTHER PUBLICATIONS

"Fuzzy Graph Tracking" by Borotschnig et al., Proc. 5th International Symposium on Intelligent Robotic Systems, H.I.Christensen and C.Brautigam and C.Ridderstrom, Ed., Centre for Autonomous Systems, KTH, 1997.*

B. Horn and B. G. Schunk, "Determining Optic Flow," Artificial Intelligence, vol. 17, pp. 185-203, 1981.

B. D. Lucas and T. Kanade, An Iterative Image Registration Technique with an Application to Stereo Vision, Intl. Joint Conf. on Artificial Intelligence, 674-679, 1981.

W. T. Freeman and E. H. Adelson, The design and use of steerable filters, IEEE Transactions on Pattern Analysis and Machine Intelligence, vol. 13, No. 9, pp. 891-906, 1991.

R. N. Rao and D. H. Ballard, An active Vision Architecture based on Iconic Representations, Artificial Intelligence, vol. 78, 461-505, 1995.

C. Papageorgiou, T. Evgeniou and T. Poggio, "A Trainable Pedestrian Detection System," in Proc. of IEEE Intelligent Vehicles Symp., pp. 241-246, Oct. 1998.

N. Srinivasa, S. Medasani, Y. Owechko, and D. Khosla, Fuzzy edge-symmetry features for improved intruder detection, The 12th IEEE International Conference on Fuzzy Systems, vol. 2, 920-925, 2003.

J. Mao and A. K. Jain, "Artificial Neural Networks for Feature Extraction and Multivariate Data Projection," IEEE Trans. on Neural Networks, vol. 6, No. 2, Mar. 1995.

N. Srinivasa, Learning and Generalization of Noisy Mappings Using a Modified PROBART Neural Network, IEEE Trans. on Signal Processing, vol. 45, No. 10, pp. 2533-2550, Oct. 1997.

S. Medasani, R. Krishnapuram, and Y. Choi, Graph Matching by Relaxation of Fuzzy Assignments, IEEE Transactions on Fuzzy Systems, 9(1), 173-183, Feb. 2001.

C. Harris and M. Stephens, A combined corner and edge detector, in Proc. of the 4th ALVEY Vision Conference, pp. 147-151, University of Manchester, English, Sep. 1988.

G. Healey and D. Slater, Global Color Constancy: recognition of objects by use of illumination-invariant properties of color distributions, vol. 11, No. 11, pp. 3003-3010, Nov. 1994.

[17] S. Gold and A. Rangarajan, A graduated assignment algorithm for graph matching, IEEE Transaction on Pattern Analysis and Machine Intelligence, vol. 18, pp. 377-387, Apr. 1996.

J. Ross Quinlan: C4.5: Programs for Machine Learning. Morgan Kaufmann 1993.

Faugeras, Three-Dimensional Computer Vision- A Geometric Viewpoint, MIT Press, 1993.

D. Rumelhart and J. McClelland, Parallel Distributed Processing, vol. 1, MIT Press, Cambridge, MA, 1986.

J. C. Bezdek, Pattern Recognition With Fuzzy Objective Function Algorithms, Plenum Press, New York, 1981.

* cited by examiner

Example of a Iconic Representation Feature Vector

FIG. 17A

| NODE | SPATIAL RELATION TO NODE#1 | | | |
|---|---|---|---|---|
| | ABOVE | RIGHT | BELOW | LEFT |
| 1 | 0.0 | 0.0 | 0.0 | 0.0 |
| 2 | 0.02 | 0.98 | 0.0 | 0.0 |
| 3 | 1.0 | 0.0 | 0.0 | 0.0 |
| 4 | 0.86 | 0.14 | 0.0 | 0.0 |
| 5 | 0.95 | 0.0 | 0.05 | 0.0 |

FIG. 17B

| NODE | SPATIAL RELATION TO NODE#2 | | | |
|---|---|---|---|---|
| | ABOVE | RIGHT | BELOW | LEFT |
| 1 | 0.0 | 0.0 | 0.98 | 0.02 |
| 2 | 0.0 | 0.0 | 0.0 | 0.0 |
| 3 | 0.02 | 0.0 | 0.98 | 0.0 |
| 4 | 0.32 | 0.0 | 0.68 | 0.0 |
| 5 | 0.31 | 0.0 | 0.69 | 0.0 |

FIG. 17C

| NODE | SPATIAL RELATION TO NODE#3 | | | |
|---|---|---|---|---|
| | ABOVE | RIGHT | BELOW | LEFT |
| 1 | 0.0 | 0.0 | 0.0 | 1.0 |
| 2 | 0.0 | 0.98 | 0.0 | 0.02 |
| 3 | 0.0 | 0.0 | 0.0 | 0.0 |
| 4 | 0.85 | 0.15 | 0.0 | 0.0 |
| 5 | 0.95 | 0.0 | 0.05 | 0.0 |

FIG. 17D

| NODE | SPATIAL RELATION TO NODE#4 | | | |
|---|---|---|---|---|
| | ABOVE | RIGHT | BELOW | LEFT |
| 1 | 0.0 | 0.0 | 0.14 | 0.86 |
| 2 | 0.0 | 0.68 | 0.0 | 0.32 |
| 3 | 0.0 | 0.0 | 0.16 | 0.84 |
| 4 | 0.0 | 0.0 | 0.0 | 0.0 |
| 5 | 0.3 | 0.0 | 0.7 | 0.0 |

FIG. 17E

| NODE | SPATIAL RELATION TO NODE#5 | | | |
|---|---|---|---|---|
| | ABOVE | RIGHT | BELOW | LEFT |
| 1 | 0.0 | 0.04 | 0.0 | 0.96 |
| 2 | 0.0 | 0.68 | 0.0 | 0.32 |
| 3 | 0.0 | 0.05 | 0.0 | 0.95 |
| 4 | 0.0 | 0.7 | 0.0 | 0.30 |
| 5 | 0.0 | 0.0 | 0.0 | 0.0 |

ACTIVE LEARNING SYSTEM FOR OBJECT FINGERPRINTING

PRIORITY CLAIM

This application is a non-provisional application, claiming the benefit of priority to provisional application No. 60/541,554, filed in the United States on Feb. 3, 2004, and titled "Method for Fingerprinting of Objects in Dynamic Environments."

FIELD OF INVENTION

The present invention relates to an object recognition system and, more particularly, to a system that enables fingerprinting of objects in a dynamic environment.

BACKGROUND OF INVENTION

Surveillance systems typically consist of a camera and monitor. Sensors are often added to notify a user if a person or object has come within the range of view of the sensor. The problem with such a system however, is that it does not identify the object or recognize the object as having been previously identified. Fingerprinting an object is the ability to identify an object based on unique features of the object. Because objects move through environments in a dynamic fashion and because of changing views and occlusion, fingerprinting objects is inherently a dynamic problem.

While there have been methods for tracking and recognizing objects from static images, there have been none that address the problem of tracking and recognizing in dynamic environments where the objects and the sensors that track and sense them are moving simultaneously. Additionally, there are currently no methods for acquiring fingerprint models of objects in an incremental and automated fashion under dynamically varying environments.

Thus, a continuing need exists for a system that allows for object identification, tracking, and fingerprinting in a dynamic environment.

SUMMARY OF INVENTION

The present invention relates to an active learning system for fingerprinting an object in an image frame. The system comprises an oriented localized filter module configured to extract features from a potential object candidate within the image frame; a learning-feature graph-fingerprinting module configured to receive the features and build a fingerprint of the object for tracking the object; and an object graph prototype module for receiving, storing, and transmitting object fingerprint information to the learning-feature graph-fingerprinting module to be updated as new features are received.

In another aspect, the system further comprises a flow-based object segmentation module for segmenting a potential object candidate from a sequence of video frames taken from a scene, and communicating the segmented potential object candidate to the oriented localized filter module for iconic feature extraction; and an incremental learning module for predicting a general class of the potential object candidate.

In yet another aspect, the system further comprises a fixed-basis function decomposition module using Haar wavelets to extract a relevant feature set from the potential object candidate; a static classifier for initial/temporary classification of the potential object candidate, thereby generating a classification category selected from a group consisting of a positive identification, a negative identification, a false positive identification, and a false negative identification, and where upon classification, the static classifier communicates the classification to the incremental learning module.

In another aspect, the oriented localized filter module is configured to receive an object model of the object candidate and compute points on the object from different views to form a feature vector at each computed point. The feature vector is based on local intensity variations present in an image region around the point as seen from a given view, such that a number of points that form the object model is selected based on local photometric energy at each point. The point is retained as an actual object point if its photometric energy is greater than a threshold, where the threshold is computed based on the photometric energy associated with points within the image region.

In another aspect, the learning-feature graph-fingerprinting module forms a fuzzy graphical model (FGM) of object candidates to fingerprint the object by representing three-dimensional (3D) spatial relationships between salient object points and corresponding two-dimensional (2D) view-dependent feature vectors.

Furthermore, the FGM utilizes an algorithm for sub-graph matching to minimize an objective function, wherein the objective function is defined by:

$$J(U, C) = \sum_{i=1}^{n+1}\sum_{j=1}^{m+1} u_{ij}^2 f(c_{ij}) + \eta \sum_{i=1}^{n+1}\sum_{j=1}^{m+1} u_{ij}(1 - u_{ij}),$$

where:
$\eta$ is a constant that controls the relative influence of the two terms in the minimization process;
$c_{ij}$ represents the absolute compatibility between nodes i in a graph A (i.e., graph A is a stored graph representing a candidate object) and j in a second graph (i.e., graph B represents an input object that is matched against graph A) (given the fuzzy assignments U), taking into account the attributes of the edges incident on nodes i and j and those of the neighboring nodes of i and j;
$C=[c_{ij}]$ is a compatibility matrix;
$u_{ij}$ is an element of an assignment matrix U, representing a degree to which node i in graph A matched node j in graph B;
n and m are the number of nodes in graphs A and B respectively;
function $f(\ )$ is similar to a distance function and takes on high values if $c_{ij}$ is low and vice versa;
compatibilities $c_{ij}$ depend on U;
assignments U depend on the compatibilities C; and
where U and C are updated in an alternating fashion, giving rise to a relaxation process.

Additionally, after the fuzzy graph model is formed, the system is configured to initiate visual tracking and track an object candidate through:
target state representation, where FGM features are hypothesized for the object candidate;
observation representation, where FGM features for the object candidate are identified in a current frame and assigned to the object candidate;
hypotheses measurement, where the features from the observation representation and target state representation are evaluated for matching properties using sub-graph matching;
hypotheses generation, where new hypothesized FGM features are formed based on the old estimation of the target state representation and old observation representation, thereby providing a dynamic tracking process.

In another aspect, the flow-based object segmentation module is configured to:

receive an input video sequence consisting of a sequence of frames;

compute points to track from the video sequence using a Harris corner detector;

compute an optical flow from the points by utilizing a Lucas Kanade approach in which a pyramid of the input sequence of frames is created to compute a two-dimensional (2D) optical flow field consisting of rows or columns at different levels using a fixed size neighborhood, where flow computed at coarser levels is then propagated to finer resolution levels;

generate a 2D flow histogram image by converting each row or column of the 2D optical flow field into a one-dimensional (1D) flow histogram and stacking the flow histograms row-wise or column-wise;

post-process the flow histogram image by utilizing a modified median filter on the flow histogram image to eliminate isolated non-zero bins;

detect background flow from the flow histogram using a Hough transform;

estimate object dimensions from the flow histogram image using the Hough transform;

update the object dimension estimates by creating an average object dimension estimate as new object dimension estimates become available; and segment the object from the scene using the object dimension estimates, the segmented object being the object candidate in the form of an object model.

In yet another aspect, the incremental learning module includes a learning-based cascaded classifier framework for predicting the general class of an object. The cascaded classifier includes a pre-learning cascade and a post-learning cascade, wherein the pre-learning cascade includes a front-end multi-layer back-propagation neural network and an initial back-end incremental learning algorithm, and wherein the post-learning cascade includes the multi-layer back-propagation neural network and an updated incremental learning algorithm.

Additionally, the multi-layer back-propagation neural network is a Non-linear Discriminant Analysis (NDA) classifier, and the back-end incremental learning algorithm is a Modified-Probabilistic Adaptive Resonance Theory (M-PROBART) classifier.

Furthermore, the fixed-basis function decomposition module is configured to learn a relevant feature set for a class of objects based on an example set of images. The example set of images is transformed from image space to wavelet space utilizing an over-complete basis-set of Haar wavelets that respond to local intensity differences at a plurality of orientations and scales, where the wavelet space operates as the relevant feature set used to train the static classifier.

In yet another aspect, the fixed-basis function decomposition module is configured to transform the example set of images from image space to wavelet space through operations of:

computing a response of wavelet filters over an image, where at least three type of wavelets, vertical, horizontal, and diagonal, are computed at different scales by forming an inner-product (dot-product) of the wavelet basis function to provide wavelet coefficients, where the wavelet coefficients serve as the relevant feature set; and utilizing absolute values of the wavelet coefficients to eliminate differences in features when considering a dark object on light background and a light object on a dark background.

Finally, as can be appreciated by one in the art, the present invention also comprises a method and computer program product for performing the operations of the invention described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fees.

The objects, features and advantages of the present invention will be apparent from the following detailed descriptions of the various aspects of the invention in conjunction with reference to the following drawings, where:

FIG. 17A is a table illustrating edge properties of the fuzzy graph of FIG. 15, in spatial relation to node #1;

FIG. 17B is a table illustrating edge properties of the fuzzy graph of FIG. 15, in spatial relation to node #2;

FIG. 17C is a table illustrating edge properties of the fuzzy graph of FIG. 15, in spatial relation to node #3;

FIG. 17D is a table illustrating edge properties of the fuzzy graph of FIG. 15, in spatial relation to node #4;

FIG. 17E is a table illustrating edge properties of the fuzzy graph of FIG. 15, in spatial relation to node #5;

DETAILED DESCRIPTION

Figure 1:
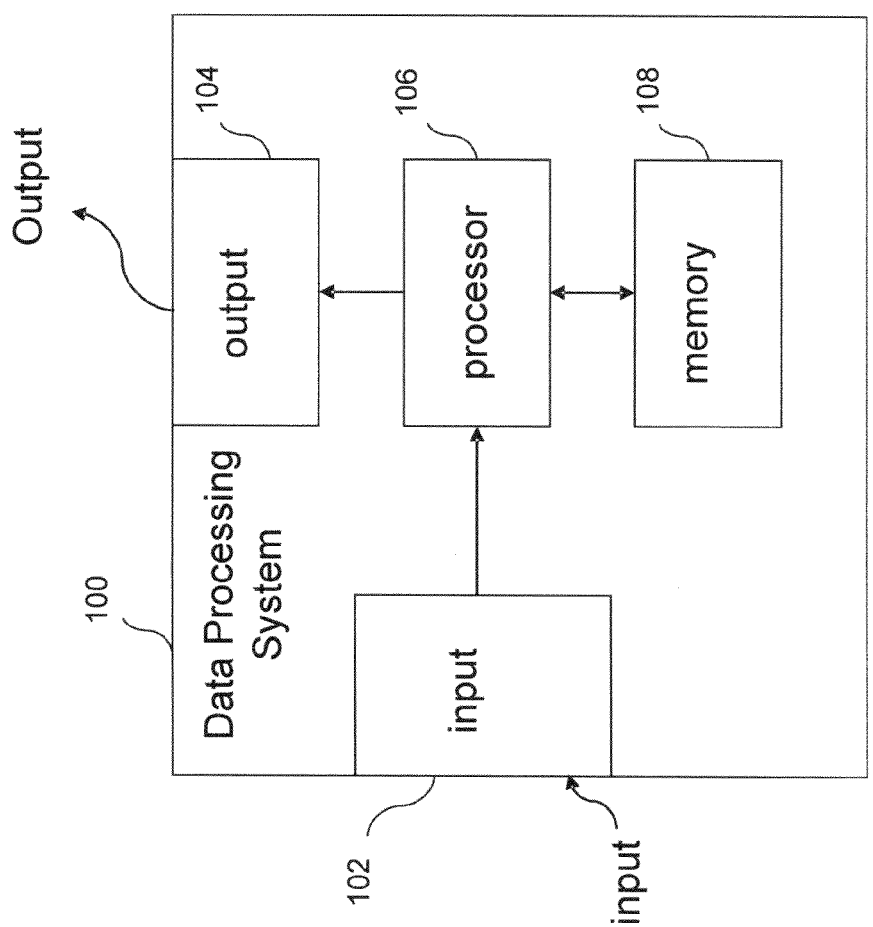
FIG. 1 is a block diagram depicting components of an active learning system according to the present invention.

The present invention provides a learning system for object fingerprinting, which may be tailored to a variety of applications. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is given as a central resource for the reader. Next, a description of various principal aspects of the present invention is provided. Third, an introduction is provided to provide the reader with a general understanding of the present invention. Finally, a detailed description of various aspects of the present invention is provided to give an understanding of the specific details.

(1) Glossary

Before describing the specific details of the present invention, a glossary is provided in which various terms used herein and in the claims are defined. The glossary provided is intended to provide the reader with a general understanding for the intended meaning of the terms, but is not intended to convey the entire scope of each term. Rather, the glossary is intended to supplement the rest of the specification in more clearly explaining the terms used.

C5 Decision Tree Learning Algorithm—The term "C5 decision tree learning algorithm" refers to an algorithm that learns sets of if-then rules from training data for discovering patterns that delineate categories, assembling them into classifiers, and using them to make predictions.

Cascaded Classifier—The term "cascaded classifier" refers to a sequence of classifiers wherein classifiers later in the sequence are used if the earlier classifier predicts the test object to be of a certain class.

Fuzzy Graph Model—The term "fuzzy graph model" means representing and modeling a directed attributed graph using fuzzy sets. The node attributes and edge attributes are modeled using fuzzy sets and membership functions.

Gaussian Derivative—The term "Gaussian derivative" refers to the $N^{th}$-order derivative of an N-D Gaussian. In our invention, we use up to a maximum of three orders.

Haar Wavelet—The term "Haar wavelet" refers to a piecewise constant function. A multiresolution of such functions forms the Haar wavelet basis.

Harris Corner Detector—The term "Harris corner detector" refers to algorithm that uses local image structure to detect corners and interest points in an image. The local structure is first computed from derivatives of the image intensity and then smoothed. A corner magnitude is used to select dominant corners in an image.

Heuristic Models—The term "heuristic models" refers to a problem-solving technique in which the most appropriate solution of several found by alternative methods is selected at successive stages of a program for use in the next act of the program. As applied to the present invention, a heuristic model can be used to estimate the dimensions of an object in an image.

Hough Transform—The term "Hough transform" refers a technique used in image analysis that allows recognition of global patterns in an image space by recognition of local patterns (ideally a point) in a transformed parameter space.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer readable medium such as a floppy disk, a CD-ROM, and a flash drive.

Kullback Information Measure—The term "Kullback Information Measure" refers to a measure of information from statistical point of view involving two probability distributions.

Lucas-Kanade—The term "Lucas-Kanade (LK)" refers to a technique for solving a linear system using information around a good feature point for computing the optical flow in an image.

Modified-Probabilistic Adaptive Resonance Theory (M-PROBART) Classifier—The term "M-PROBART Classifier" refers to a function approximation approach that achieves superior generalization over other adaptive resonant theory (ART) based approaches.

Non-linear Discriminant Analysis (NDA) Classifier—The term "NDA Classifier" refers to an approach of using multilayer perceptrons to extract discriminating parameters between classes of objects. This is achieved by setting the number of nodes in the last hidden layer to a small number thus decreasing input feature redundancy and extracting relevant information for classification.

Pyramidal Lucas-Kanade—The term "Pyramidal Lucas-Kanade (LKP)" refers to a technique that expands upon the LK approach, utilizing a pyramid of the input frames to compute flow at different levels using a fixed size neighborhood, where flow computed at coarser levels is then propagated to finer resolution levels. At each level, the LK algorithm is used to compute the flow field and to propagate the flow value to the next level. This process is repeated for all of the good feature points resulting in the flow field.

Wavelet—The term "wavelet" refers to mathematical functions that cut up data into different frequency components and then study each component with a resolution matched to its scale.

Wavelet Basis Functions—The term "wavelet basis functions" refers to the collection of shifted and dilated wavelet functions of a particular family of wavelets.

Wavelet Filter—The term "wavelet filter" refers to using wavelet basis functions for filtering signals.

(2) Principal Aspects

The present invention has three "principal" aspects. The first is an active learning system. The active learning system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read-only memory (ROM), and flash-type memories. These aspects will be described in more detail below.

A block diagram depicting the components of an active learning system of the present invention is provided in FIG. 1. The active learning system 100 comprises an input 102 for receiving information from at least one sensor for use in detecting an object in a scene. The input 102 may include multiple "ports." Typically, input is received from at least one sensor, non-limiting examples of which include video image sensors. An output 104 is connected with the processor for providing information regarding the presence and/or identity of object(s) in the scene to other systems in order that a network of computer systems may serve as an active learning system for object fingerprinting. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software to be manipulated by commands to the processor.

Figure 2:
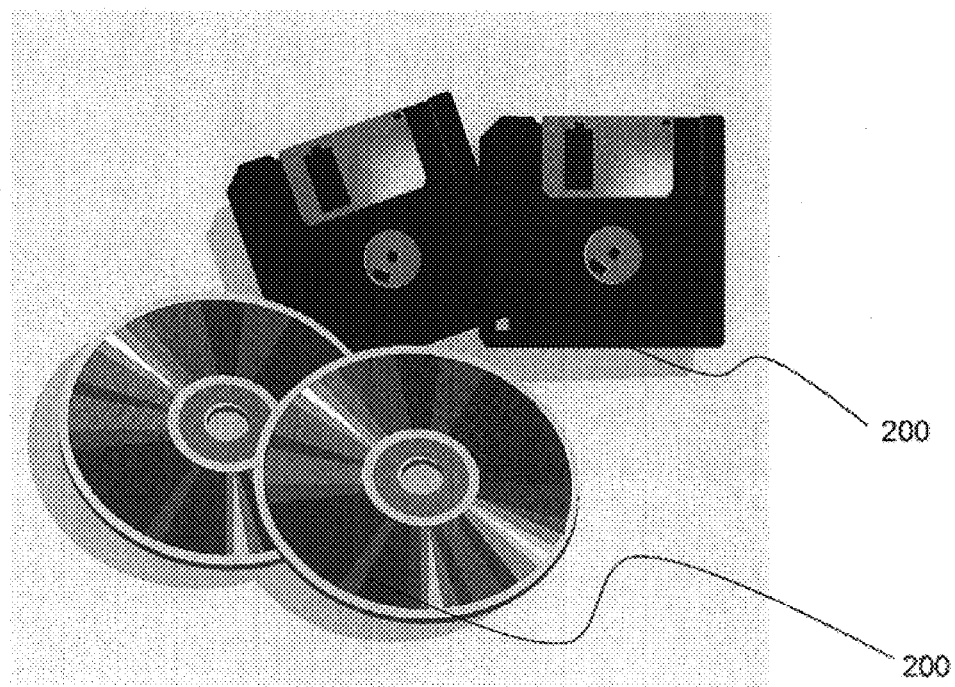
FIG. 2 is an illustrative diagram of a computer program product embodying the present invention.

An illustrative diagram of a computer program product embodying the present invention is depicted in FIG. 2. The computer program product 200 is depicted as an optical disk such as a CD or DVD. However, as mentioned previously, the computer program product generally represents computer readable code stored on any compatible computer readable medium.

(3) Introduction

The present invention relates to an active learning system for object fingerprinting. The problem of tracking and fingerprinting objects is inherently a dynamic problem because objects move through environments in a dynamic fashion, and because of changing views and occlusion. Fingerprinting an object is the ability to identify an object based on unique features of the object. For example, if the object appears in other environments in familiar views, or in some cases views not perceived in the past, the object can still be recognized (identified) based on its features.

The present invention utilizes an integrated approach to perform tracking and fingerprinting of objects, wherein the features used for tracking are also used for fingerprinting. The system is adaptive and capable of rapidly modifying object models to changing views and false positives that may affect system performance. Using an incremental learning approach and fuzzy graph models, the system provides for robust confirmatory identification and tracking of individual three-dimensional (3D) video objects in a 3D environment. The system can be used in a variety of security, surveillance and tracking systems.

(4) Description

Figure 3:
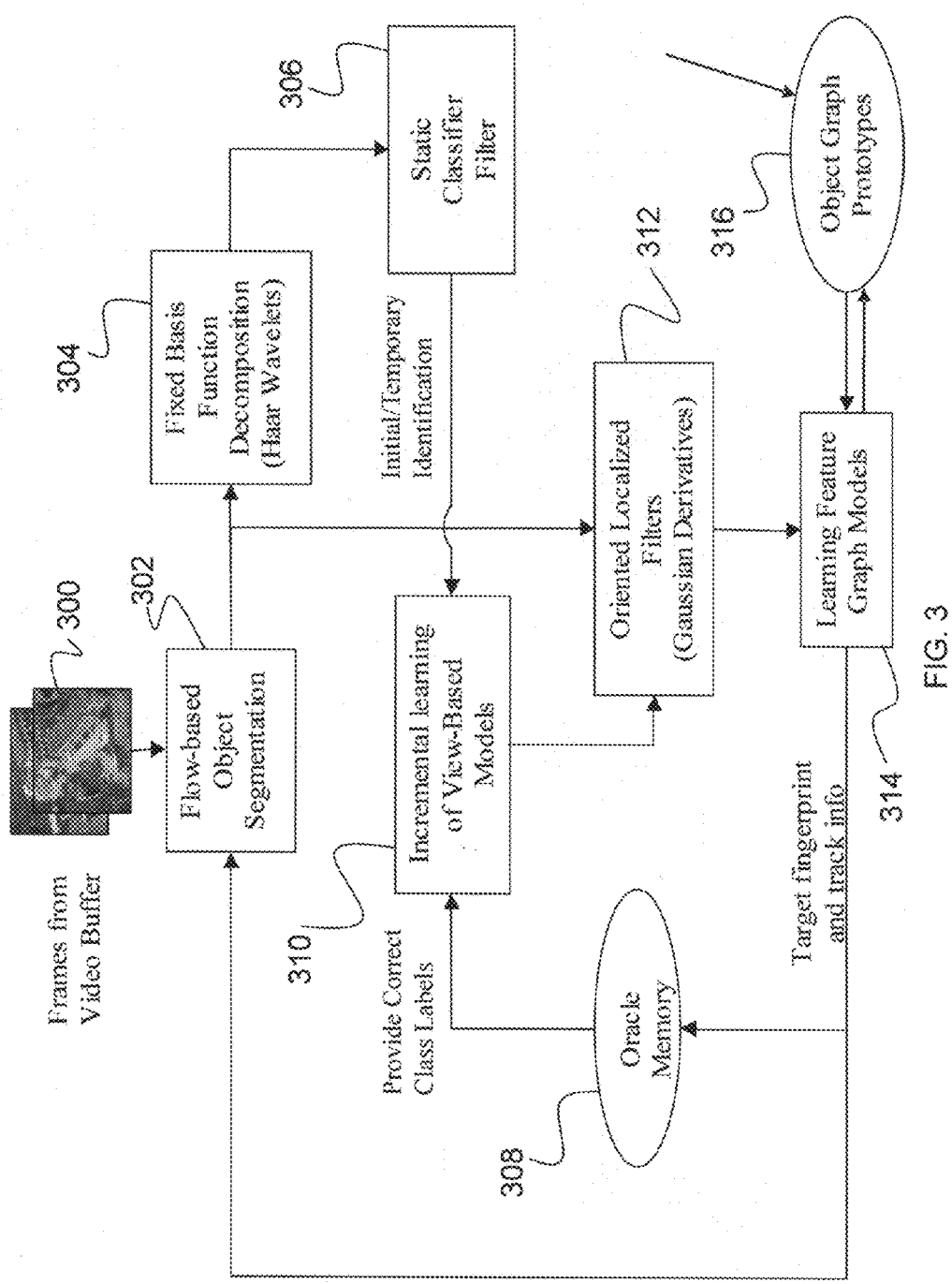
FIG. 3 is a flow chart illustrating incremental learning for fingerprinting of objects according to the present invention.

Architecture for the present invention is shown in FIG. 3. Potential object candidates are first segmented from a sequence of video frames 300 using a flow-based segmentation module 302. For each of the object candidates, a fixed-basis function decomposition module 304 based on Haar wavelets is used to extract low-level features (i.e., a relevant feature set). These features are passed onto a static classifier 306 for initial/temporary classification of each object candidate. The static classifier 306 is trained on a basic set of examples of the objects that are sought to track and fingerprint, and is also provided with non-object examples.

Since the space of non-object examples is practically infinite, the static classifier 306 is bound to make mistakes on some examples of either object images or non-images, thereby generating false positives and false negatives. To correct for these mistakes, the present invention optionally utilizes an oracle memory 308 that is capable of providing and verifying the correct class labels for every object candidate. An option for an oracle memory 308 is to insert a human in the loop, where the human compares the image to the classification provided by the static classifier 306 and thereafter labels the classification as either a positive, negative, false-positive, or false-negative classification. Another choice is to use an object tracker module, which contains the track list of current objects, with a priori knowledge that it is extremely accurate under some conditions. For example, a vehicle classifier could be used to identify the vehicle when the vehicle is seen from the front or back at close range. Using the correct class labels from the oracle 308, the system is capable of incrementally reshaping the object class decision boundaries using an incremental learning module 310. In this manner, the system can incrementally learn view-based models of objects. Once the incremental object classification learning module 310 corrects the mistakes, the system then proceeds to extract iconic features from the potential object candidate using an oriented localized filter module 312. Using the iconic features, the system continues to build and refine fingerprint models for the object candidate utilizing a learning-feature graph-fingerprinting module 314. The learning-feature graph-fingerprinting module 314 is configured to use fuzzy graphical models (FGM) of object candidates to fingerprint the objects. Additionally, an object graph prototype module 316 is included for receiving, storing, and transmitting object fingerprint information (object graph prototypes) to the learning-feature graph-fingerprinting module 314 to be updated as new features are received.

Figure 4:
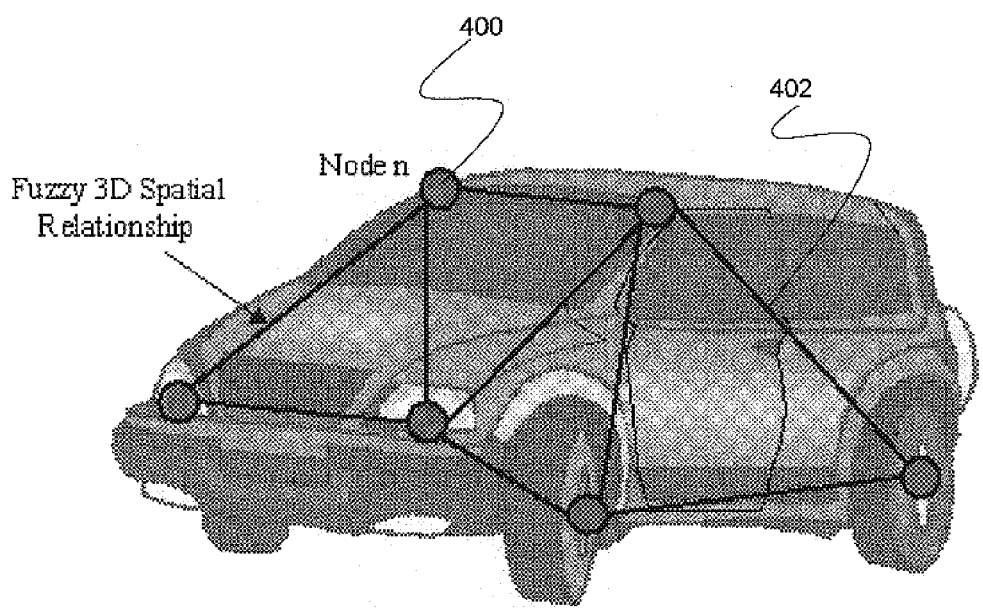
FIG. 4 is an illustration of a fuzzy graph model encoding a three-dimensional (3D) spatial relationship between object points in a two-dimensional (2D) view with salient feature vectors.

As shown in FIG. 4, fuzzy graph models (FGM) are used to represent the three-dimensional (3D) spatial relationships between the salient object points 400 and corresponding two-dimensional (2D) view-dependent feature vectors 402. The fuzzy nature of the models allows for a great deal of flexibility in the matching and learning of fingerprinting models. The FGM also provides the robustness to learn under partially occluded conditions (i.e., where a portion of the object is partially obstructed from view). The nodes of graph models store local features of the object. Once the fuzzy graph models are constructed, then visual tracking is initiated with a visual track number assigned to each object candidate. The visual track number is fed back to both the oracle memory 308 (useful if a tracker is used for providing labels) and the flow-based segmentation module 302 to make the search for object candidates in future frames more efficient. Use of the present invention allows a user to answer queries such as, "Is that yellow car the same one as seen a week ago?" The present invention also provides the possibility of directly fingerprinting an object even if it cannot determine the class of the object being fingerprinted. In such an example, the system can answer queries such as, "Is that object the same one as the one being tracked a few minutes ago?"

Visual tracking can be divided into two types of approaches, bottom-up and top-down. Bottom-up approaches generally tend to construct target states by analyzing the content of images. Top-down approaches generate candidate hypotheses of the target state from previous time frames based on some parametric representation of the target. The present invention combines both the bottom-up and top-down approaches to achieve robust tracking.

The tracking approach of the present invention is partitioned into four components: target state representation, observation representation, hypotheses measurement, and hypotheses generation. The target state representation for the approach of the present invention is based on two different feature types. The first feature type is the 3D locations of all the salient points of an object as encapsulated by the corresponding 3D graph model. The second feature type will be a colored iconic representation at each of these 3D locations based on local intensity measurements. Observation representation is also based on the 3D model and consists of the two feature types as discussed above. Hypotheses measurement evaluates the matching between target state hypotheses and their image observations in the current frame. Hypothesis generation produces a new state hypothesis based on the old estimation of the target's representation and old observation, which implies the evolution of the dynamic process. Using the target and observation representation as described above, a two-scale matching strategy is adopted to perform hypothesis measurement. At the finer scale, the present invention matches the individual 3D nodes based on normalized cross-correlation between the colored iconic representation of the target node in the prior frame with the observed state of the 3D node being matched in the current frame. At a coarser scale, the fuzzy graph matching technique is utilized to match a tracked fuzzy sub-graph from the prior frame with nodes matched at the finer scale for the current frame. The coarse scale essentially matches the entire target as a single entity.

This approach provides tracking and fingerprinting capabilities in cluttered environments. Since the objects to be tracked and fingerprinted are moving dynamically, it is imperative that the system be adaptive and capable of rapidly modifying object models to changing views and false positives that may affect system performance. This adaptability is achieved by using an incremental learning framework that reacts to changing environments as well as changing object shapes and views, and adapts the object models that are being tracked and fingerprinted in an on-line fashion. As the objects are tracked, new object views become visible and the incremental learning module is used to add new nodes and views to the FGMs representing each object. Once a 3D FGM is formed for an individual object, new virtual 2D views of the individual object can be easily generated for tracking purposes using video cameras in different locations and views. In addition, if necessary, the FGM representation allows tracking to be done using a single video camera. This approach results in accurate confirmatory identification and 3D tracking of individual objects.

The learned 3D models can also be used to generate virtual views of objects for active learning. Active learning allows the system to adjust to the current environment and illumination conditions, thereby increasing detection rates and reducing false alarms.

(a) Object Segmentation Using Optical Flow

This section describes the robust and computationally efficient approach to object segmentation using the flow-based object segmentation module. The process for object segmentation corresponds to the process shown and described in U.S. patent application Ser. No. 11/004,501, whose entire disclosure is hereby incorporated by this reference as though fully set forth herein. Observing a moving object using a panning camera results in different apparent motions for the background and foreground object, which reduces the effectiveness of conventional photometric statistical background estimation techniques for object segmentation. Optical flow methods can be used in such situations. However, it can be easily appreciated that optical flow vectors arising from moving objects in a real-world scene observed by a moving camera can be very noisy. The present approach involves using stacked histograms of optical flow vectors to robustly estimate object positions, heights, and widths. The flow patterns induced by the background and other objects in a scene can be approximated in the flow histograms by linear segments. Discovering the segments corresponding to objects enables estimation of the object's geometric properties like height and width. This information is transformed in the raw optical flow maps into a stacked optical flow histogram space that is less noisy, easy to compute, and enables fast and accurate estimation of the positions and widths of objects.

Figure 5:
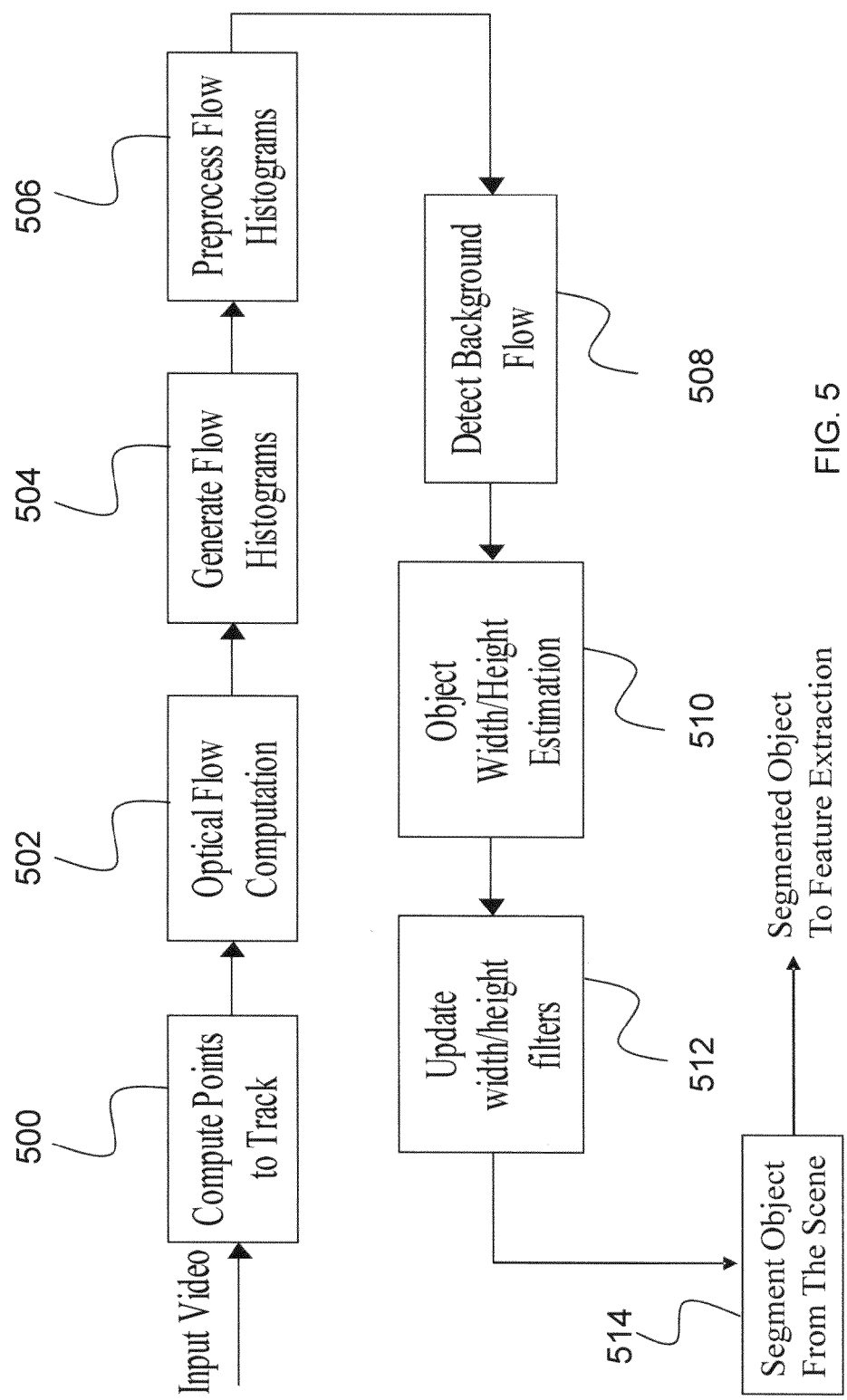
FIG. 5 is a flow chart of a flow-based object segmentation approach according to the present invention.

FIG. 5 is a flow chart of a flow-based object segmentation approach according to the present invention. For effective computation of flow vectors, a Harris corner detector is used to locate points of interest (compute points to track) 500. Using the points of interest, a pyramidal version of the Lucas Kanade approach is utilized in which a pyramid of the input frames is created to compute optical flow 502 at different levels using a fixed-size neighborhood. The flow computed at coarser levels is then propagated to the finer resolution levels.

Figure 6A:
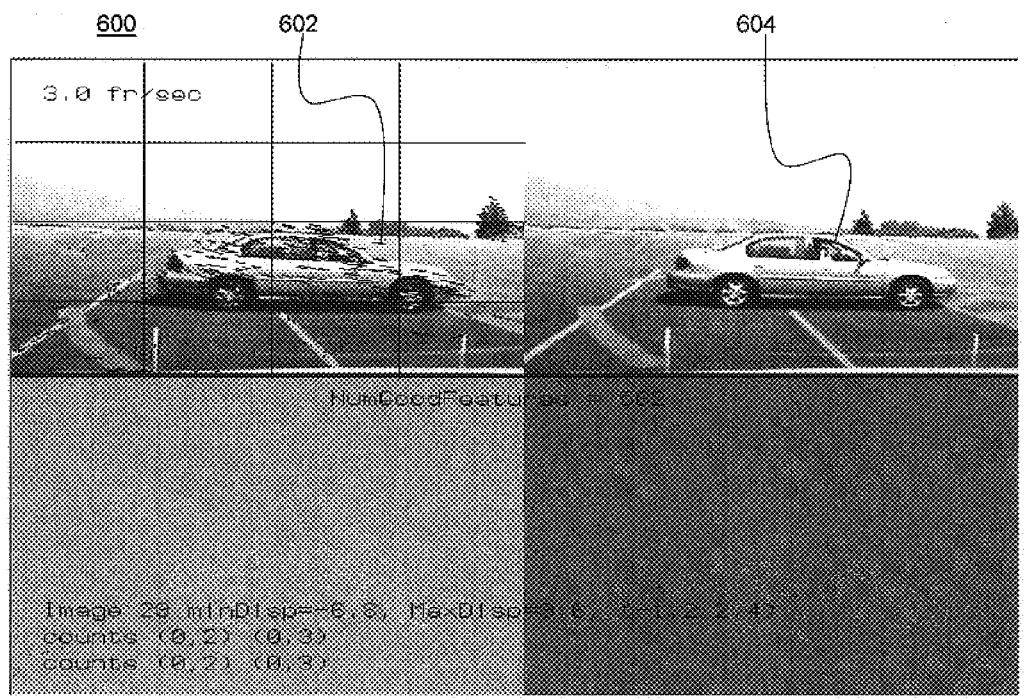
FIG. 6A is an illustration of flow vectors resulting from a flow-based object segmentation system according to the present invention.
Figure 6B:
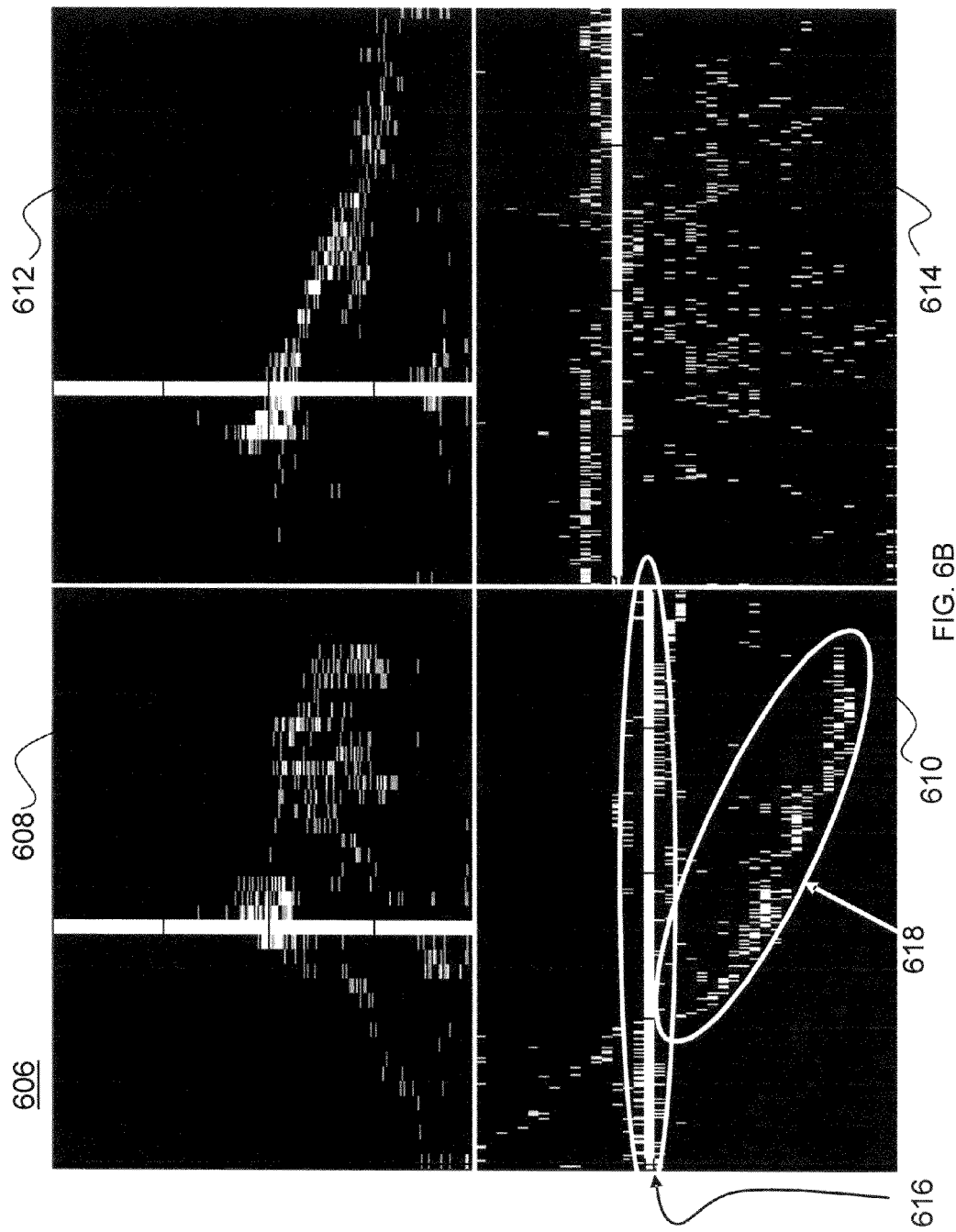
FIG. 6B is an illustration of flow histograms resulting from the flow-based object segmentation system according to the present invention.

Once the apparent flow field is computed, the 2D flow field is converted into a flow histogram image 504. The optical flow field consists of horizontal and vertical components. Because histograms can be computed in two directions (i.e., horizontal and vertical), a total of four projections are generated. FIG. 6A illustrates an exemplary 2D flow map 600 showing flow vectors 602 from an object 604 moving across a scene. FIG. 6B illustrates an exemplary flow histogram 606 generated from the 2D flow map 600 of FIG. 6A. The four projections are shown in FIG. 6B, showing a horizontal-component in a horizontal direction 608, a horizontal-component in a vertical direction 610, a vertical-component in a horizontal direction 612, and a vertical-component in a vertical direction 614. In this exemplary scenario, both the video camera host platform and the target vehicle are moving. As seen in FIG. 6B, the background flow 616 is modeled by a horizontal line and the object flow 618 by a diagonal line.

Referring to FIG. 5, in a post-processing step 506, a modified median filter is used on the flow histogram to eliminate isolated non-zero bins. After the flow histogram is computed, the linear component corresponding to the background flow in the scene is detected 508 using a Hough transform (HT) in the flow histogram space. The next step involves estimating the object height and width 510, with a final step of updating width/height filters 512.

The Hough transform provides the properties of the linear segment corresponding to the background flow in the scene and helps to eliminate the flow induced by the background. To this effect, simple heuristics are used to delete flow vectors in the flow histogram space that are close to the line segment modeling the background flow. Next, median distances are computed between points in the remaining segments to the background line. Points constituting the segment that are farthest from the background flow are then clustered to find the center and the extent of the object in the x and y directions. The process is not trivial since dense flow is not always guaranteed. Also, poor texture in the object might result in the linear segment corresponding to an object being broken into several smaller segments with holes in between. To account for this, heuristic models are used to accurately estimate the widths of the objects 510. In this approach, the estimates of the object width and height are filtered using 1D Gaussians. The mean and standard deviation of the distributions are adapted as estimates of the object widths and heights become available 512. The filtered estimates of the object height and width, and thereby the position, are then used to segment the object from the scene 514.

The segmented object is then passed to the feature extraction routine (described in section (b) below) to learn the specific representation of the objects in the scene. To further improve the stability of the window position estimates, the system fuses the previous estimate of the object flow vector and the estimate of displacement of the selected iconic feature points across frames to restrict the location of the new window position.

Figure 7:
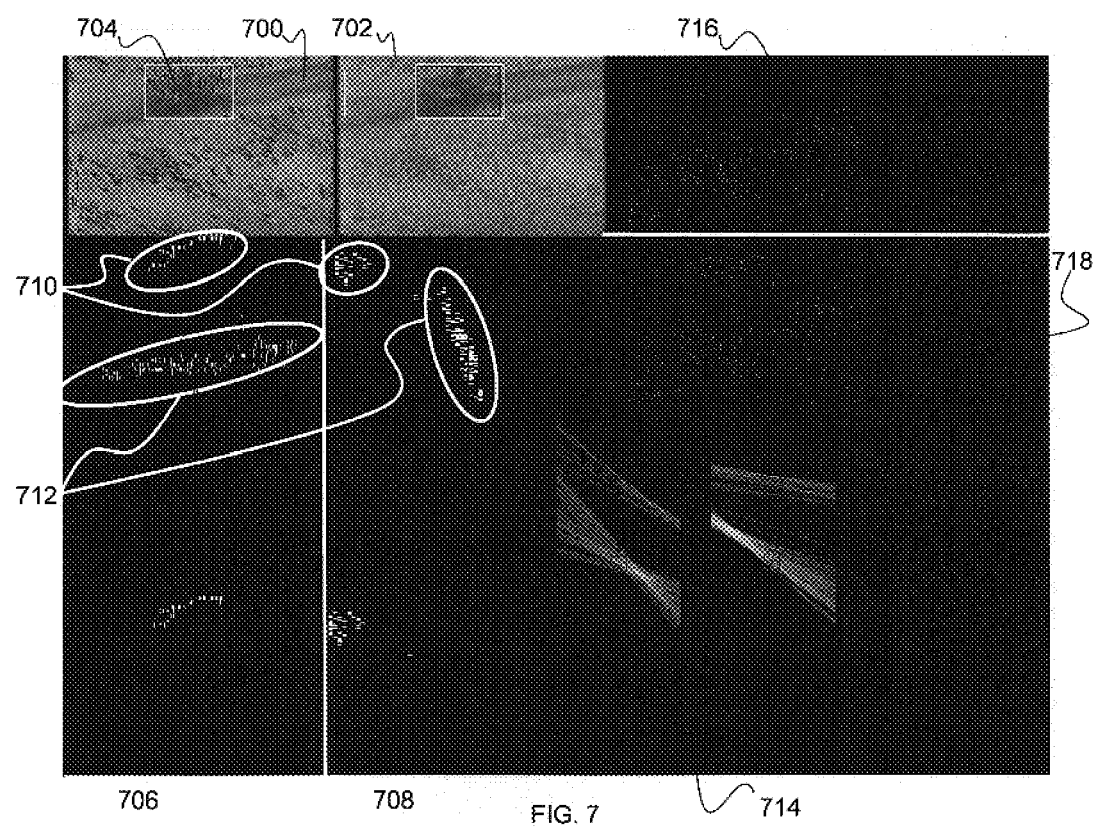
FIG. 7 is a screen shot of the flow-based object segmentation system operating on a sequence of vehicle operation.

FIG. 7 illustrates the flow-based object segmentation system operating on an exemplary vehicle sequence. As shown in FIG. 7, two time frames, time t 700 and t+1 702, can be used to create optical flow. FIG. 7 further illustrates an exemplary segmented object region 704; filtered vertical 706 and horizontal 708 projections of the U-component (horizontal-component) flow vectors showing clustered object 710 and background 712 flows; corresponding Hough spaces 714 for detecting background flow; and the 2D representations of the horizontal-component 716 and the vertical-component 718.

(b) Feature Extraction

The present invention performs salient feature extraction utilizing two different types of features: (1) iconic object-based features; and (2) image-based features. The iconic features are generated using oriented local filters formed from Gaussian derivatives. The image-based features are extracted by analyzing area of interests (AOI) using a fixed set of localized basis functions, such as Haar wavelets or similar functions. Each of the localized basis functions is associated with a fixed location, scale, and orientation in the AOI. Unlike the iconic features, these image-based features have fixed spatial relationships. The iconic features are used to form "bottom-up" models of targets that are built up from local object features, whereas the image features form "top down" models from analysis of the AOI using a fixed set of analysis functions.

(i) Computation of Iconic Features Using an Oriented Localized Filter Module

Figure 8A:
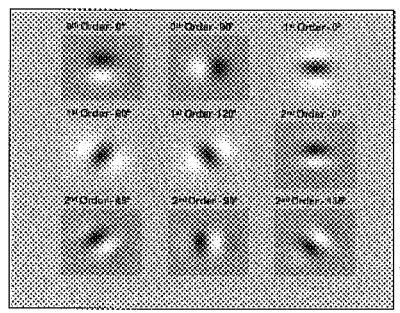
FIG. 8A is an illustration of Gaussian derivative 2D projective features, showing basis functions.
Figure 8B:
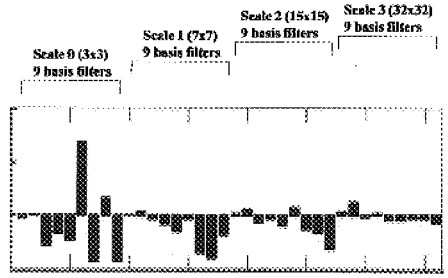
FIG. 8B is an illustration of Gaussian derivative 2D projective features, showing an example iconic feature vector for four scales.
Figure 8C:
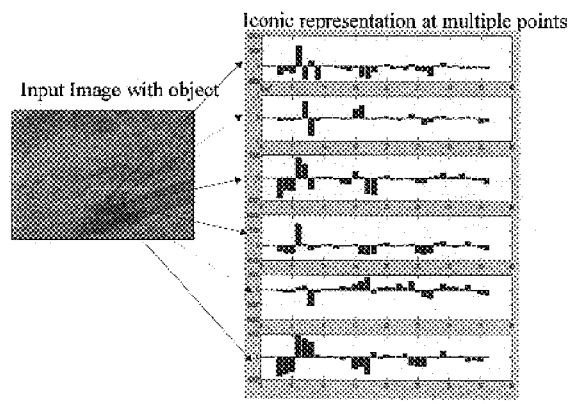
FIG. 8C is an illustration of Gaussian derivative 2D projective features, showing an example set of iconic filter responses at various points on an object.
Figure 9A:
FIG. 9A is an illustration of a training image used in an exemplary active learning cascade.
Figure 9B:
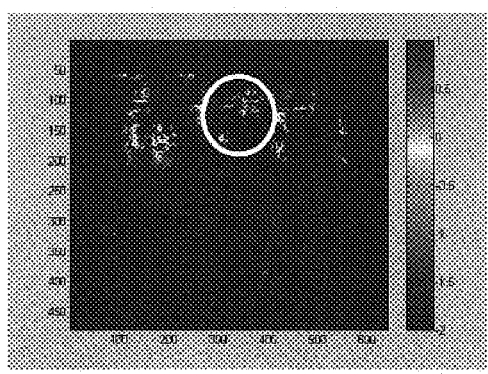
FIG. 9B is an illustration of a pre-learning saliency map using the training image of FIG. 9A, showing active learning cascade performance.
Figure 9C:
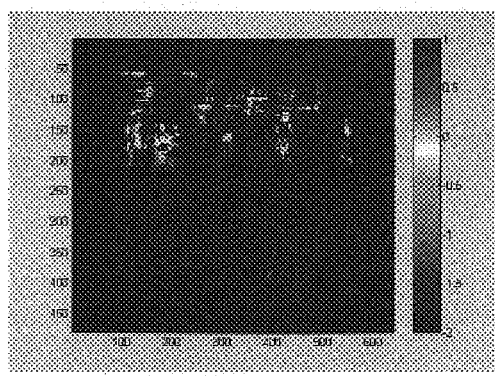
FIG. 9C is an illustration of a post-learning saliency map using the training image of FIG. 9A, showing active learning cascade performance.
Figure 10A:
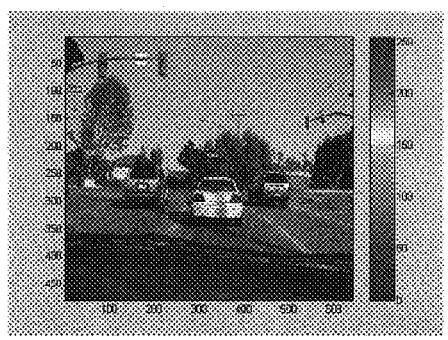
FIG. 10A is an illustration of another training image used in an exemplary active learning cascade.
Figure 10B:
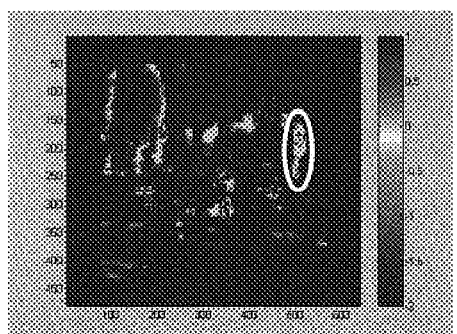
FIG. 10B is an illustration of a pre-learning saliency map using the training image of FIG. 10A, showing active learning cascade performance.
Figure 10C:
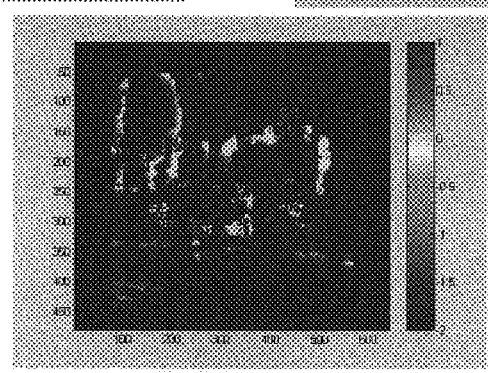
FIG. 10C is an illustration of a post-learning saliency map using the training image of FIG. 10A, showing active learning cascade performance.
Figure 11A:
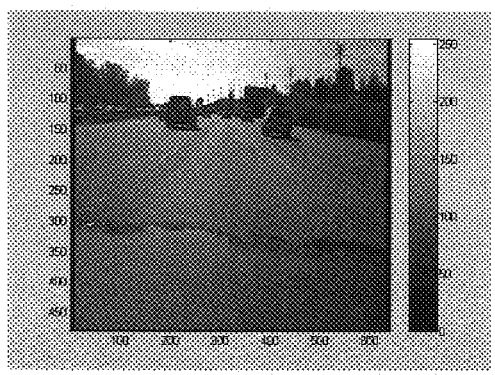
FIG. 11A is an illustration of a test image used in an exemplary active learning cascade.
Figure 11B:
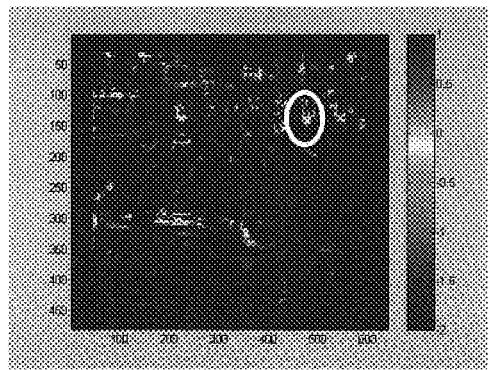
FIG. 11B is an illustration of a pre-learning saliency map using the test image of FIG. 11A, showing active learning cascade performance.
Figure 11C:
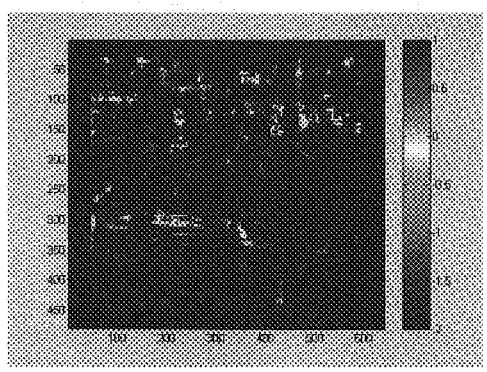
FIG. 11C is an illustration of a post-learning saliency map using the test image of FIG. 11A, showing active learning cascade performance.
Figure 12A:
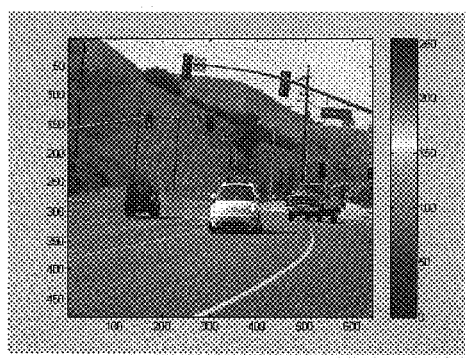
FIG. 12A is an illustration of another test image used in an exemplary active learning cascade.
Figure 12B:
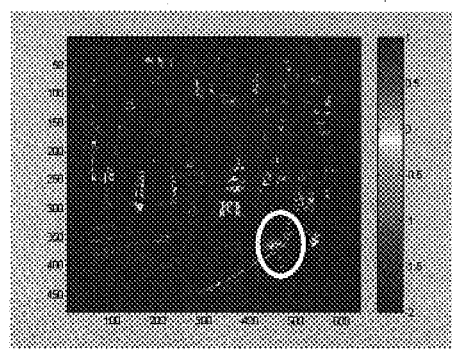
FIG. 12B is an illustration of a pre-learning saliency map using the test image of FIG. 12A, showing active learning cascade performance.
Figure 12C:
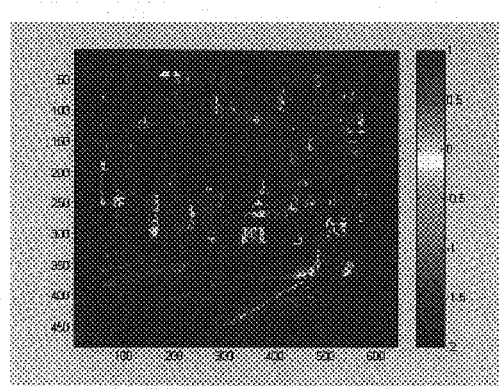
FIG. 12C is an illustration of a post-learning saliency map using the test image of FIG. 12A, showing active learning cascade performance.

The iconic features are in the form of a high-dimensional feature vector comprised of the responses of different order derivatives of steerable Gaussian filters at a range of orientations and scales. FIG. 8A illustrates exemplary basic filters for the basis orientations for up to the third derivative of a Gaussian filter. As shown in FIG. 8B, such a feature vector forms an effective photometric description of local intensity variations that may be present in the image region around the object point or AOI. In its most basic form, the basis filter orientation for each order of the Gaussian derivative is used at multiple scales. In its most general form, the feature vector comprises of n elements with responses of m oriented basis filters at k different scales. For a sufficiently large number of m and k parameters, a relatively large number of measurements are obtained at an image point that makes its characteristic vector or its iconic representation practically unique. For color images, the dimensionality of the vector will increase by a factor of three (one for each color channel) making the representation even more immune to noise. An example of the iconic representation for an object at different locations on the image is shown in FIG. 8C. To make the representation invariant to illumination changes, an energy matrix is computed that is built by measuring the energy of various patches on the object, based on the iconic representation. The energy matrix of an object under two different illuminants is linearly related. The linear relation can be exploited to estimate an illumination change matrix that can be used to compare the object under two different illumination conditions. The object boundary for feature extraction using the iconic representation is provided by the flow-based segmentation approach described above.

The object model is be defined by the iconic representation at a set of points on the object. The present invention takes advantage of the 3D model of the object (as described below) to select the relevant set of points from different views and depths. The iconic feature vector at each computed point will be based on the local intensity variations that may be present in the image region around the point of interest as seen from a given view. The number of points that form the object model is selected based on the local photometric energy or spectral power at each point. A point is deemed to be important if its photometric energy is greater than a threshold that is computed based on the mean and standard deviation of the energy associated with points within the object region.

(ii) Computation of Image Features Using the Fixed Basis Decomposition Module

The Haar wavelet-based approach to object detection is capable of learning a relevant feature set for a class of objects based on an example set of images. The relevant feature set can be used to train a classifier that can accurately predict the class of the object. To incorporate high spatial resolution and to efficiently capture global structure, over-complete/redundant wavelet basis is used. The present invention applies this multi-scale feature extraction approach to various application domains, non-limiting examples of which include automotive occupant sensing for smart airbags and detection of faces, detection of pedestrians, and detection of vehicles for collision avoidance and surveillance applications. For example, face and vehicle detection utilizes visible illumination, while near infrared illumination may be used for the automotive occupant sensing application. As another non-limiting example, both visible and infrared illumination may be used in pedestrian detection applications. Haar wavelet features have proven to be equally effective in both visible and infrared wavelengths.

The present invention utilizes an over-complete basis-set of Haar wavelets that respond to local intensity differences at several orientations and scales. A set of labeled training data from the various occupant classes is used to learn an implicit model for each of the classes. The occupant images used for training are transformed from image space to wavelet space and are then used to train a classifier. For a given image, the wavelet transform computes the response of the wavelet filters over the image. Typically three oriented wavelets, vertical, horizontal, and diagonal, are computed at different scales. The multi-scale approach allows the system to represent coarse as well as fine-scale features. The over-complete representation corresponds to a redundant basis wavelet representation, thereby providing an exceptional spatial resolution. This is accomplished by shifting wavelet templates by some portion of the template. An absolute value of the wavelet coefficients is used to eliminate the differences in features when considering a dark object on a white background, and vice-versa. Additionally, the Haar wavelet features can be implemented very efficiently using the concept of an "integral image." The integral image is the same size as the AOI. Each point in the integral image is calculated as the sum of all pixels whose row and column indices are less than or equal to those of the point. Once the integral image is calculated, the sum of all pixels inside any rectangular area (i.e., rectangular sub-feature) can be calculated using only four table lookups and four addition operations. These rectangular sub-features can be combined to form the final wavelet features as well as other related features that maximally respond to center-surround or line structures.

(c) Creating Object Models

There are two types of object models that can be constructed from the salient features extracted above. The two types are view-based object models and iconic feature-based fingerprinting models. The first type is used to predict the general class of the object in question and the second type is used to obtain the specific 1D of the object.

An incremental learning module including an incremental learning view-based cascaded classifier is used to predict the general class of an object (e.g., tank, car, truck, pedestrian, etc.). The cascaded classifier has two levels, the first level being a pre-learning cascade such as a front-end multi-layer back-propagation neural network and an initial back-end incremental learning algorithm, and the second level being a post-learning cascade such as a multi-layer back-propagation neural network and an updated incremental learning algorithm. As a non-limiting example, the multi-layer back-propagation neural network is a Fast Non-linear Discriminant Analysis (NDA) classifier, and the back-end incremental learning algorithm is a Modified-Probabilistic Adaptive Resonance Theory (M-PROBART) classifier.

In the iconic-feature-based model, 3D object models are constructed from multiple views by 3D fuzzy attributed relational graphs (FARGs). The node attributes of the fuzzy graph representing an object in a frame are comprised of the iconic features extracted from each view. The edge attributes between neighboring nodes represent fuzzy spatial relations of the type "left-of," "above," etc. Objects in this scheme are thus represented using 3D FARGs. Comparing the objects is then done in the graph domain and not in the original image domain. As such, fuzzy graph matching methods (as described below) are used for classification and recognition of 3D fuzzy graph-based object models. The distance metric for ascertaining compatibilities between nodes in two graphs is the normalized cross-correlation score between the respective iconic features. Since the object and/or system may be moving and could have changed its view of the object in the subsequent frame or, be viewed from a different perspective by a different camera or, some parts may be occluded, not all features will match between consecutive frames. The fuzzy graph approach described herein can handle inexact matching by exploiting the tolerance of fuzzy graphs to partial matches during classification.

(i) Incremental Learning View-Based Object Models Using the Incremental Learning Module This section further describes the incremental learning view-based cascaded classifier framework for predicting the general class of an object. For further illustration, below is an example image as input into the cascade. The cascade then computes the pre-specified Haar wavelet and edge symmetry features, and thereafter classifies the window as belonging to one of the pre-defined classes. The following example and results are for demonstrative purposes only and are not intended to limit the use and scope of invention described herein. Rather, these results are intended to assist the reader in obtaining a better qualitative understanding of the concepts presented herein.

In the following non-limiting example, an incremental learning cascaded classifier is used to detect vehicles in scenes. The cascaded classifier includes a front-end fast multi-layer back-propagation neural network such as a Non-linear Discriminant Analysis (NDA) classifier, and a back-end incremental learning algorithm such as an online learning-capable Modified-Probabilistic Adaptive Resonance Theory (MPROBART) classifier. Use of the MPROBART classifier corresponds to the process described in U.S. Pat. No. 6,456,991, whose entire disclosure is hereby incorporated by this reference as though fully set forth herein.

A 10,446 example feature set was collected from a variety of imagery using camcorders, digital cameras, and wide-angle lens cameras. The data set was partitioned into 5,041 training images and 5,045 test images of front and back views of vehicles. The fast NDA classifier was trained on 142 selected Haar wavelet features. These features were sub-selected from a much larger set by using the Kullback information measure and the C5 decision tree learning algorithm. A slow NDA classifier was also trained on a 173 dimensional feature vector that included the 142 Haar wavelet features with an additional 31 edge symmetry features. The edge symmetry features contain information about the symmetry of the object about horizontal and vertical axes. The Fast NDA classifier has approximately a 95.9% average prediction accuracy on both the vehicle and non-vehicle classes. The M-PROBART classifier was trained on the same dataset as the Fast NDA classifier and was found to have a prediction accuracy of 94.9% on both the vehicle and non-vehicle classes.

To quantify the incremental learning results, a diverse set often images was picked to form a training set. The ten images have varying backgrounds and vehicles of different sizes. The goal was to process each of the ten images using the incremental learning cascaded classifier and then select the false-positive and false-negative points from each of the saliency maps. Features were extracted from 2:3 aspect ratio windows around the selected false positive and false negative points, and then fed to the incremental learning module to learn the erroneous classifications. In the ten images, over 700 false positives were manually selected. The M-PROBART classifier of the active learning cascade starts off with 155 rules. Features from selected points in each of the ten images are fed sequentially to the incremental learning module. The M-PROBART classifier finally ends up with 164 rules after it trains through the new features. To test the generalization capability of the active learning cascaded classifier, four images were selected that were captured using the varying input types, including a digital camera, a camcorder, and a wide-angle lens camera, under widely varying conditions. Seven cars were selected from these four images and passed through the pre-learning cascade and the post-learning cascade classifiers. The pre-learning cascade included the fast NDA and the M-PROBART before active learning was performed, while the post-learning cascade included the fast NDA and an updated M-PROBART. A total of 50,312 windows were processed across the four test images with window heights set to 70 pixels or 100 pixels. The pre-learning cascaded classifier provided 157 core vehicle points and 88 false-alarm points while detecting all the selected seven vehicles. Additionally, the post-learning cascaded classifier detected 159 core vehicle points and only 45 false-alarm points. In effect, the active learning phase reduced the false-positives by almost 50% without any significant reduction in the detection rate.

FIGS. 9-12 illustrate the pre-learning and post-learning saliency maps for a few of the training and test images shown. FIGS. 9A and 10A are the original testing images, FIGS. 9B and 10B are their corresponding pre-saliency maps, and FIGS. 9C and 10C are the corresponding post-saliency maps. FIGS. 11A and 12A are the original images test image, FIGS. 11B and 12B are their corresponding pre-saliency maps, and FIGS. 11C and 12C are the corresponding post-saliency maps. In the saliency maps, the areas marked by an ellipse are the areas where the false alarms are significantly reduced. Furthermore, the red regions are NDA/M-PROBART vehicle positives, while yellow regions are NDA false positives that are rejected by M-PROBART. A key advantage to this approach is that it is readily extendible to any other class of objects.

There are two main reasons for the extendibility of the present approach. First, the approach relies on a static classifier that is trained on a generic feature set generated using the Haar wavelets to act as the primary filter. The feature set can be readily generated for any other class of objects much like the vehicle classifier. Second, the fingerprinting is based on fuzzy graph models that are flexible and robust and can model any object class. Finally, the features at the nodes of the fuzzy graph models are based on Gaussian derivative filters that are only dependent on local image properties, and that can model any other class of objects as well.

(ii) Fuzzy Graph Matching for Iconic Feature-Based Fingerprinting Models Using the Learning Feature Graph Fingerprinting Module The proposed fuzzy FARG matching algorithm uses ideas from relaxation labeling and fuzzy set theory to solve problems associated with sub-graph isomorphism. The algorithm can handle exact as well as inexact sub-graph matching. The fuzzy FARG matching utilizes an algorithm for sub-graph matching to minimize an objective function. The objective function is defined by:

$$J(U, C) = \sum_{i=1}^{n+1}\sum_{j=1}^{m+1} u_{ij}^2 f(c_{ij}) + \eta \sum_{i=1}^{n+1}\sum_{j=1}^{m+1} u_{ij}(1 - u_{ij}). \quad (1)$$

In equation (1), $\eta$ is a constant that controls the relative influence of the two terms in the minimization process, $c_{ij}$ represents the absolute compatibility between nodes i in graph A (i.e., graph A is stored graph representing a candidate object) and j in graph B (i.e., graph B represents an input object that is matched against graph A) (given the fuzzy assignments U), taking into account the attributes of the edges incident on nodes i and j and those of the neighboring nodes of i and j. In other words, $C=[c_{ij}]$ is the compatibility matrix. Additionally, $u_{ij}$ is an element of an assignment matrix U, representing a degree to which node i in graph A matched node j in graph B. Furthermore, n and m are the number of nodes in graphs A and B respectively. The function ƒ( ) is similar to a distance function and takes on high values if cy is low and vice versa. As mentioned above, the compatibilities $c_{ij}$ depend on U. Similarly, the assignments U depend on the compatibilities C. U and C are updated in an alternating fashion, giving rise to a relaxation process. The update equations for the FGM algorithm are based on the Lagrange method and use the Karush-Kuhn-Tucker conditions.

The computational complexity of the FGM algorithm can be shown to be $O(n^2m^2)$. Computing compatibilities is the most computationally expensive part of the FGM algorithm. Note that in this model, the graphs are completely connected, even though the strengths of relations between edges may be zero.

Figure 13A:
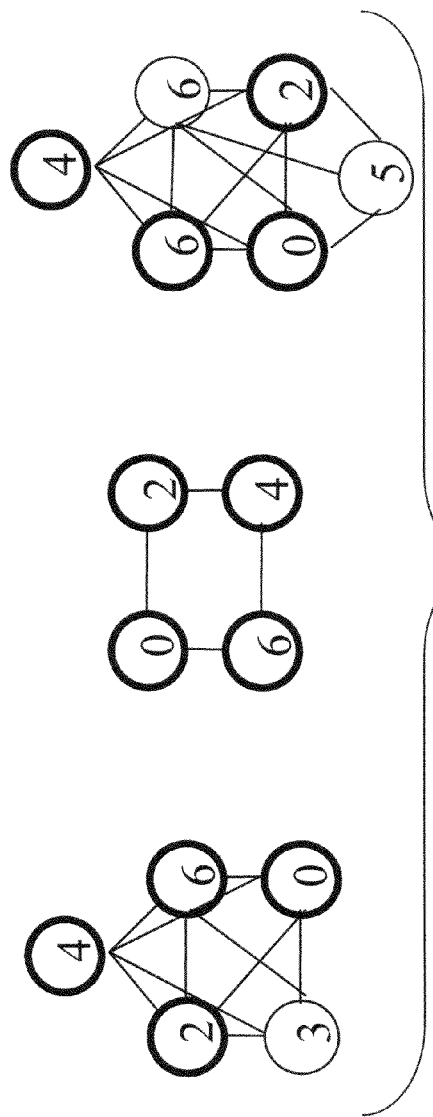
FIG. 13A illustrates graphical representations of multiple views of an object.
Figure 13B:
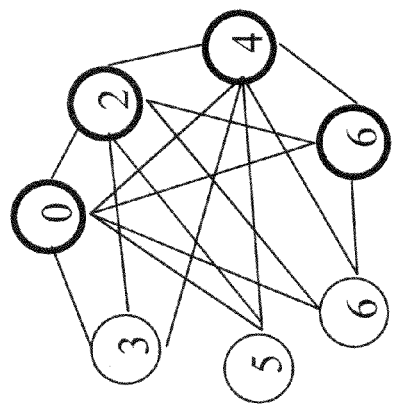
FIG. 13B illustrates a multi-view graphical representation of the multiple views shown in FIG. 13A.

FIG. 13A illustrates exemplary graphical representations of an object from multiple views, while FIG. 13B illustrates the resulting multi-view graph. As different views of the object become available, the system generates their corresponding graphical representations. Since the views are gradually evolving, there will be several nodes in common to this graph suite.

(d) Further Experimental Results

The description above provides examples for the various sub-components of the present invention. Following are experimental results that illustrate the fingerprinting aspect of the present invention. As mentioned previously, the following example and results are for demonstrative purposes only and are not intended to limit the use and scope of invention described herein. Rather, these results are intended to assist the reader in obtaining a better qualitative understanding of the concepts presented herein.

To this effect, two example sequences were used of an un-manned aerial vehicle (UAV)-based camera system tracking a tank and a truck in a desert environment. In these sequences, an active camera is mounted on a UAV and the UAV hovers over a tank and a truck capturing video as they drive through the desert. The video sequence is challenging because there are a lot of elements that change dynamically, such as the location of the UAV (and hence the camera) with respect to the object causing changes in scale and view of the object. In addition, the object is moving which results in changing views and scales as well, with a goal of tracking the objects. These sequences were selected to demonstrate the unique fingerprinting approach described herein.

After the object is segmented using the flow segmentation approach discussed above, the Gaussian derivative filter responses are extracted at all the pixels within the window. In order to limit the number of points on the object, the system then computes the photometric energy (computed as the $L_2$ norm of the filter response) of the points within the segmented window. The mean energy is computed and used as a measure to filter points. In particular, points are filtered at energy levels much below the mean energy, thereby eliminating points with very little photometric energy such as image patches with little or no texture. An additional constraint based on distance between high-energy points is applied. This step prevents selecting points in close proximity, thereby reducing the redundancy in the points selected and improving the richness of the information captured. The filtered points are then used to build a fingerprint (i.e., a fuzzy graph model) for the object being tracked. An aspect of this feature point selection process is that it also provides an approach for adaptively recruiting new points for the model over time to adapt to changes such as different views, scale changes of the object of interest etc. By carefully selecting points using the photometric energy criterion instead of performing random sampling, the system can achieve faster learning rates and better recognition performance than traditional example-based passive learning algorithms.

Figure 14:
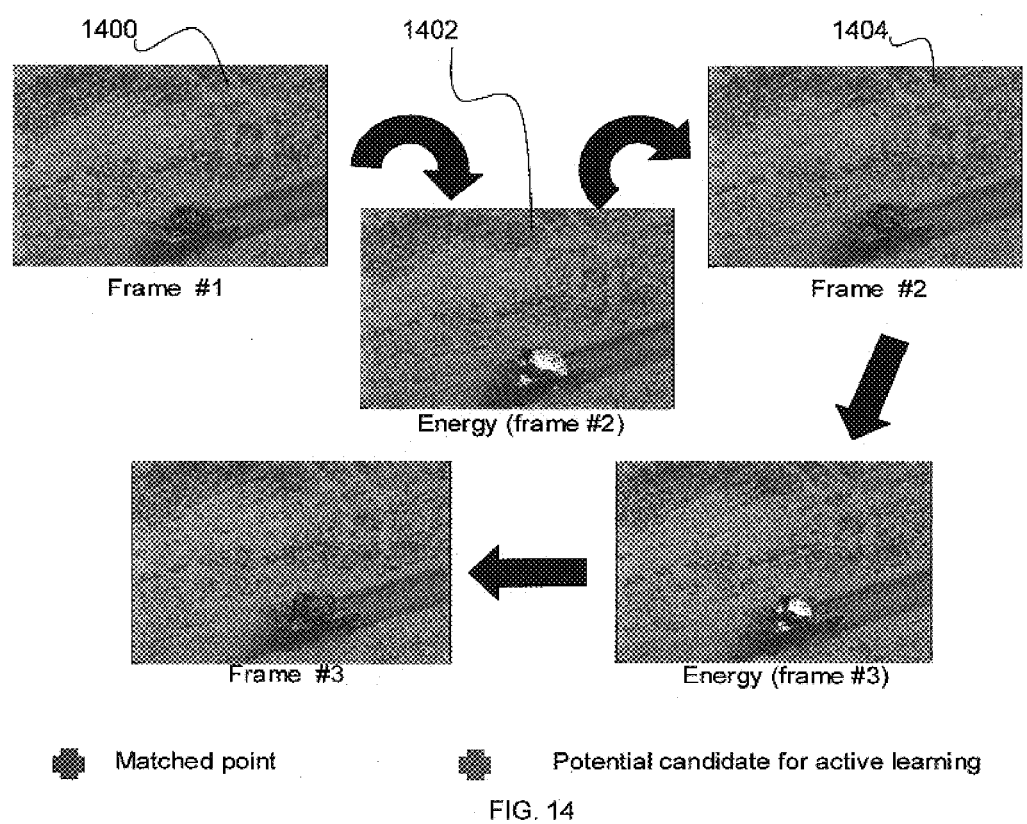
FIG. 14 illustrates a sequence of frames, showing a concept of actively seeking points of interest.

FIG. 14 illustrates an example of this idea using high-energy points to guide the process of fingerprinting and actively seeking points to include for updating the fingerprinting model. FIG. 14 illustrates this process as provided for the first few frames of a tank sequence. In the first frame 1400, all the points (marked in red) are the candidates selected for the tank based on the energy criterion. The high-energy points in the next frame 1402 are shown in white. The fuzzy graph model built in the first frame 1400 is then matched to the high-energy points in the second frame 1404. This also allows for new points to be recruited as marked in green. This procedure is repeated in the next set of frames as shown.

Figure 15:
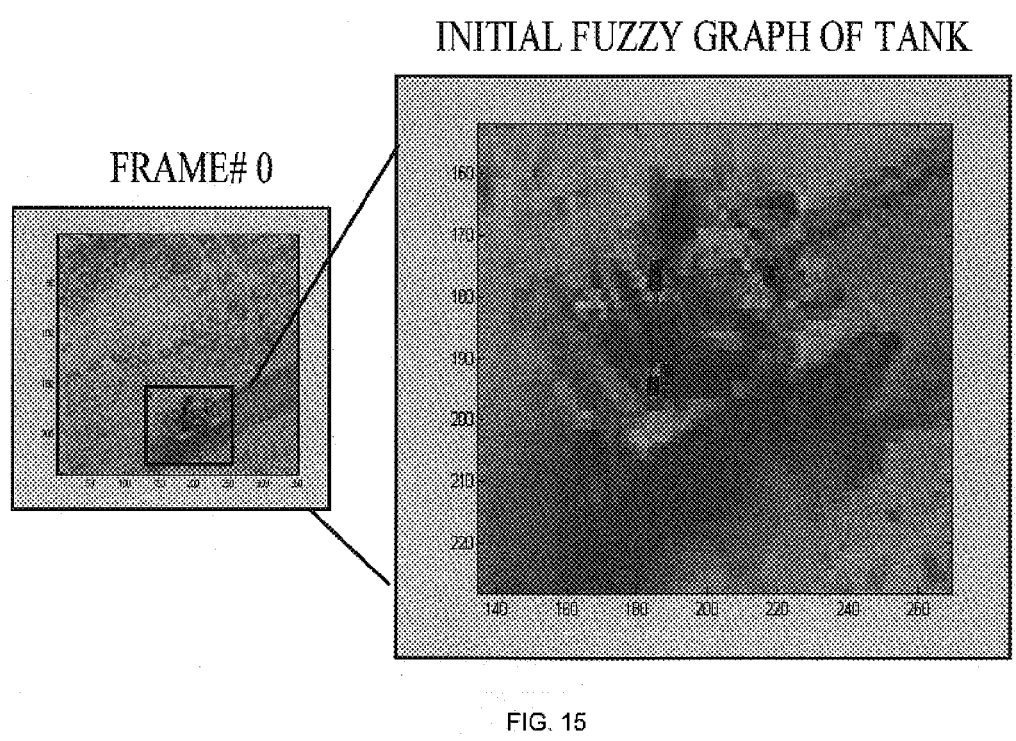
FIG. 15 illustrates an initial fuzzy graph model of an exemplary object.
Figures 16A, 16B:
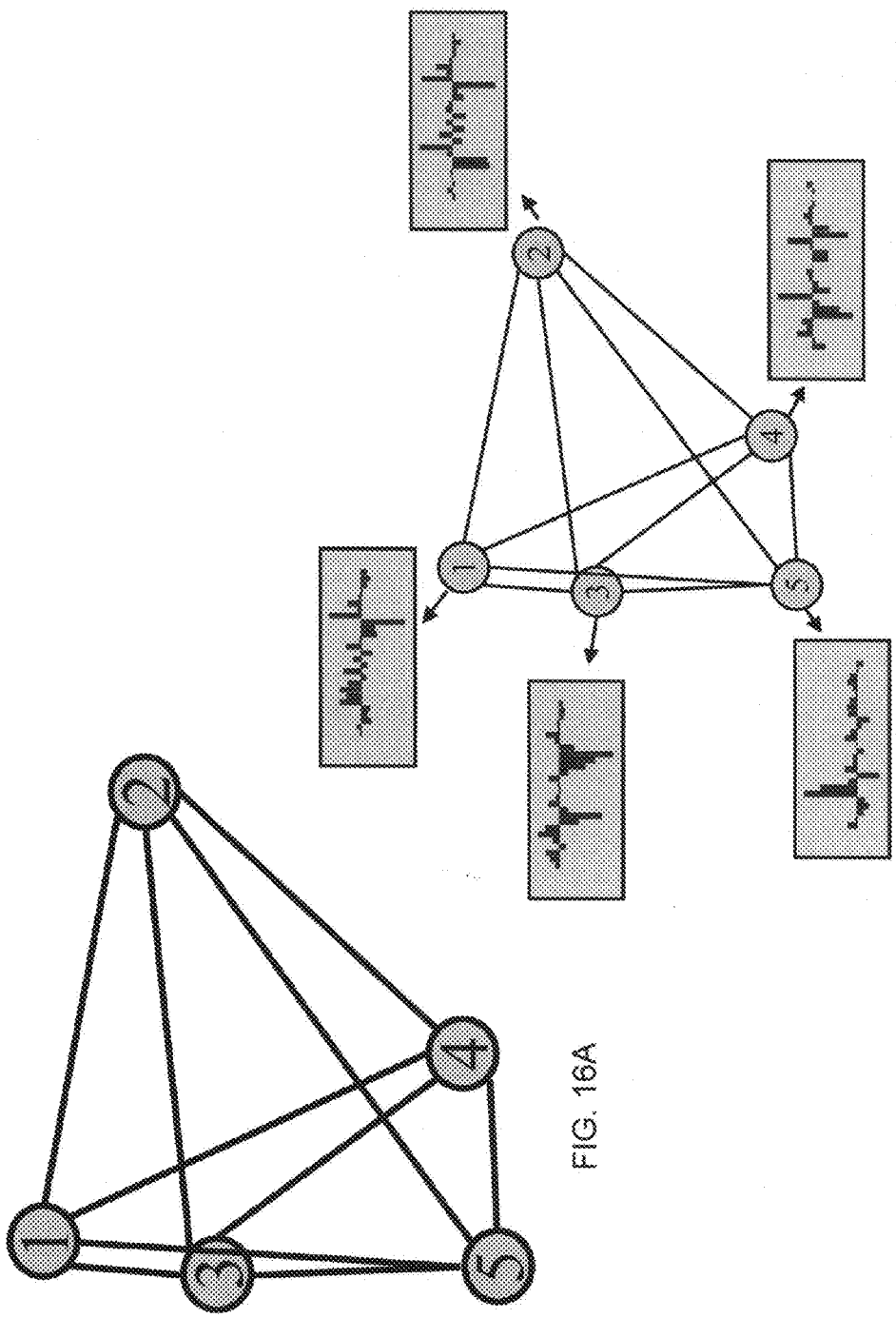
FIG. 16A illustrates a fuzzy graph for the model of FIG. 15.
FIG. 16B illustrates a fuzzy graph and its node properties for the model of FIG. 15.

Following are fingerprinting results obtained for the two video sequences. FIG. 15 illustrates a fuzzy graph of the tank for the first frame of FIG. 14. The fuzzy graph is the fingerprint for the object. In this embodiment, the fuzzy graph nodes contain the Gaussian derivative filter responses for a gray-scale version of the tank. The responses include 27 dimensions (i.e., 9 basis filters×3 scales: 7×7, 15×15, and 31×31). FIG. 16A illustrates the fuzzy graph for the tank in the first frame, while FIG. 16B illustrates the fuzzy graph of FIG. 16A with its node properties.

The fuzzy graph also possesses edge properties. The edge properties define the spatial relationships between the node locations in the image. In this 2D example, there are four attributes (i.e., above, right, below, and left) for each edge of the fuzzy graph. These attributes define the relative spatial location of a node with respect to all the other member nodes of the fuzzy graph. The attributes for the edges of the fuzzy graph for the tank object in the first frame of FIG. 14 are shown in FIGS. 17A through 17E in the form of attribute tables. As shown in FIGS. 17A through 17E, the properties for each node are compared against the properties for every other node. For example, FIG. 17A is a table illustrating edge properties of the fuzzy graph of FIG. 15, in spatial relation to node #1; FIG. 17B is a table illustrating edge properties of the fuzzy graph of FIG. 15, in spatial relation to node #2; FIG. 17C is a table illustrating edge properties of the fuzzy graph of FIG. 15, in spatial relation to node #3; FIG. 17D is a table illustrating edge properties of the fuzzy graph of FIG. 15, in spatial relation to node #4; and FIG. 17E is a table illustrating edge properties of the fuzzy graph of FIG. 15, in spatial relation to node #5. Using the present invention, it is easy to add other node properties such as color, as well as depth attributes for the edges if 3D information is available.

The fuzzy graph of the tank in the first frame (i.e., numeral 1400 shown in FIG. 14) is then used to match high-energy points in the second frame (i.e., numeral 1402 shown in FIG. 14). The fuzzy graphs matching process involves minimizing the objective function in equation (1) using the node and edge properties of the fuzzy graph. Accordingly, nodes of the first fuzzy graph (i.e., numeral 1400 in FIG. 14) are matched with the high-energy candidate points in the second frame (i.e., numeral 1402 in FIG. 14). The matches are then checked for overall compatibility in terms of a graph where both the local features at the nodes and the global features match (in this case the spatial relations between them).

Figure 18:
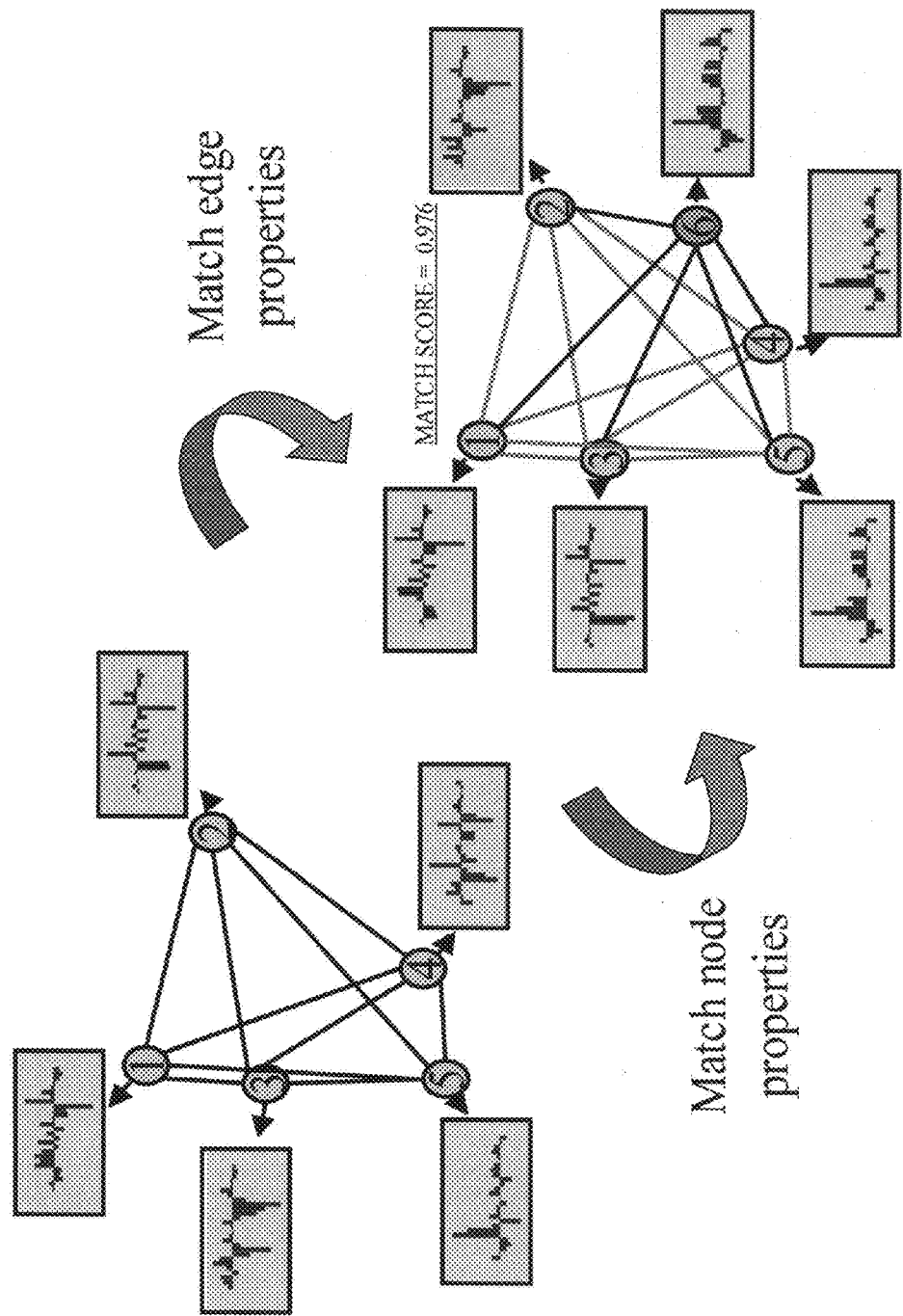
FIG. 18 illustrates a fuzzy graph matching process for the first two frames in the exemplary sequence of FIG. 14.
Figure 19A:
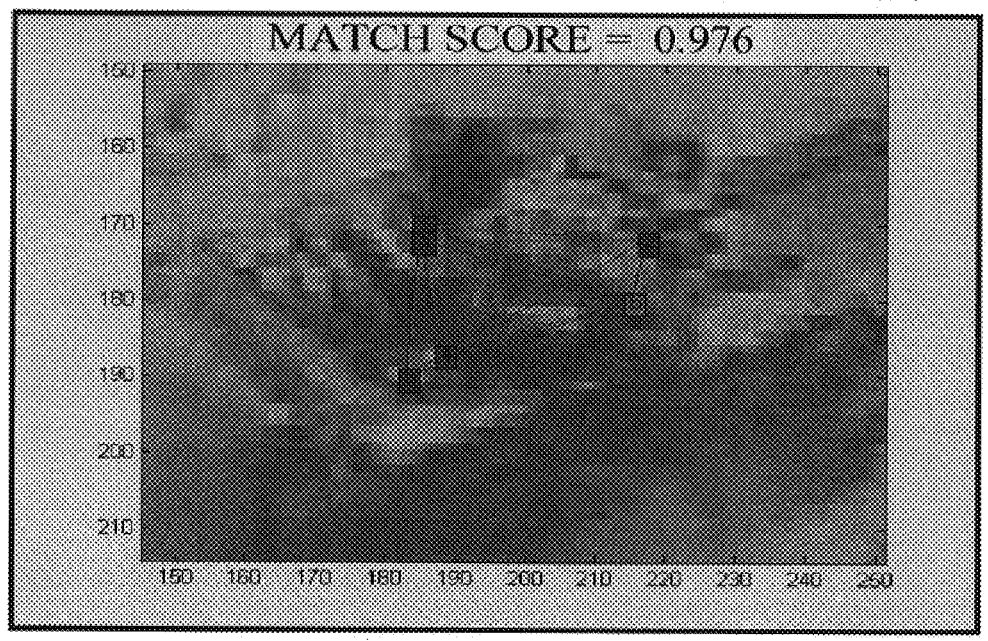
FIG. 19A illustrates a fuzzy graph matching result for an exemplary sequence of a tank, showing the learned fuzzy graph in frame #1 after matching with frame #0.
Figure 19B:
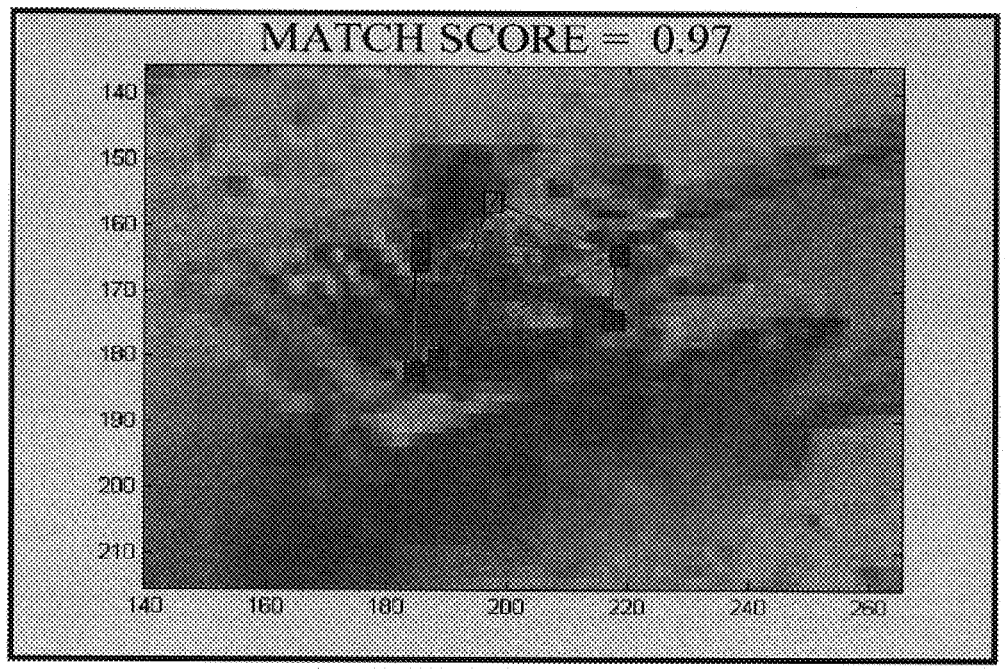
FIG. 19B illustrates a fuzzy graph matching result for the exemplary tank sequence; showing the learned fuzzy graph in frame #2 after matching with frame #1.
Figure 19C:
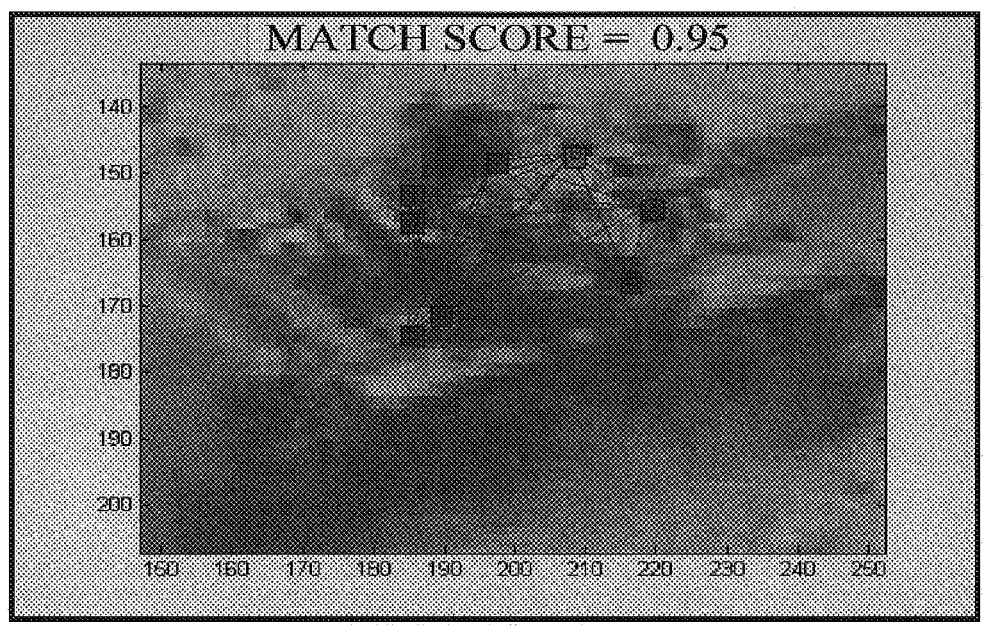
FIG. 19C illustrates a fuzzy graph matching result for the tank exemplary sequence, showing the learned fuzzy graph in frame #3 after matching with frame #2.
Figure 19D:
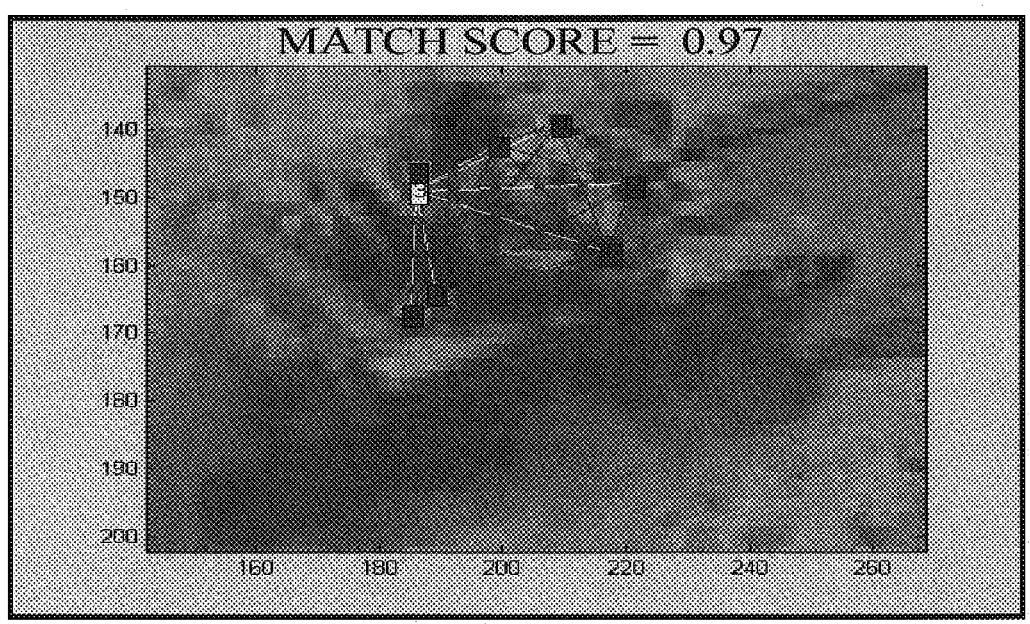
FIG. 19D illustrates a fuzzy graph matching result for the exemplary tank sequence, showing the learned fuzzy graph in frame #4 after matching with frame #3.
Figure 20A:
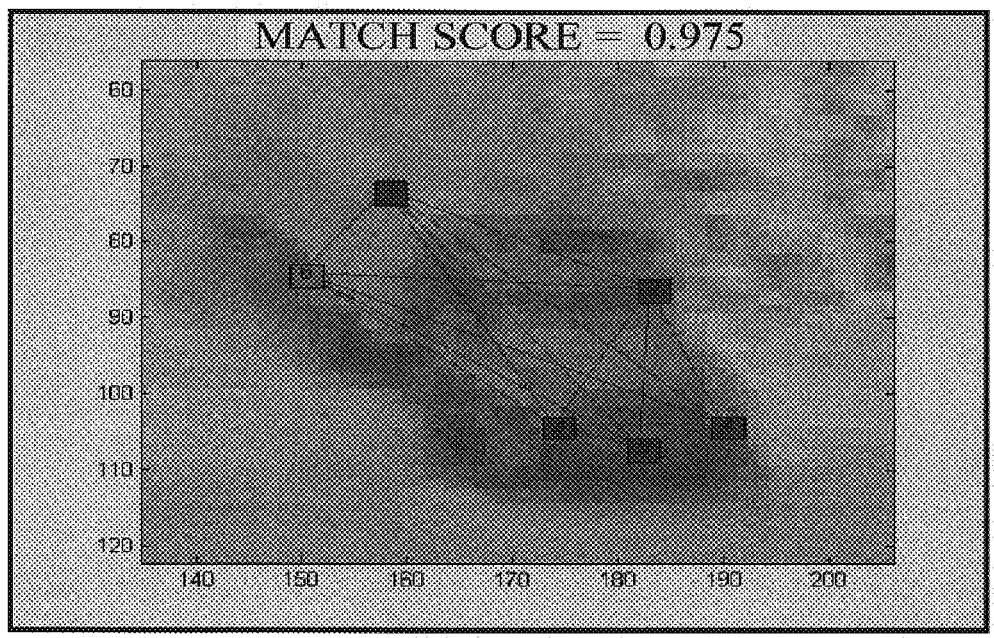
FIG. 20A illustrates a fuzzy graph matching result for an exemplary sequence of a truck, showing the learned fuzzy graph in frame #1 after matching with frame #0.
Figure 20B:
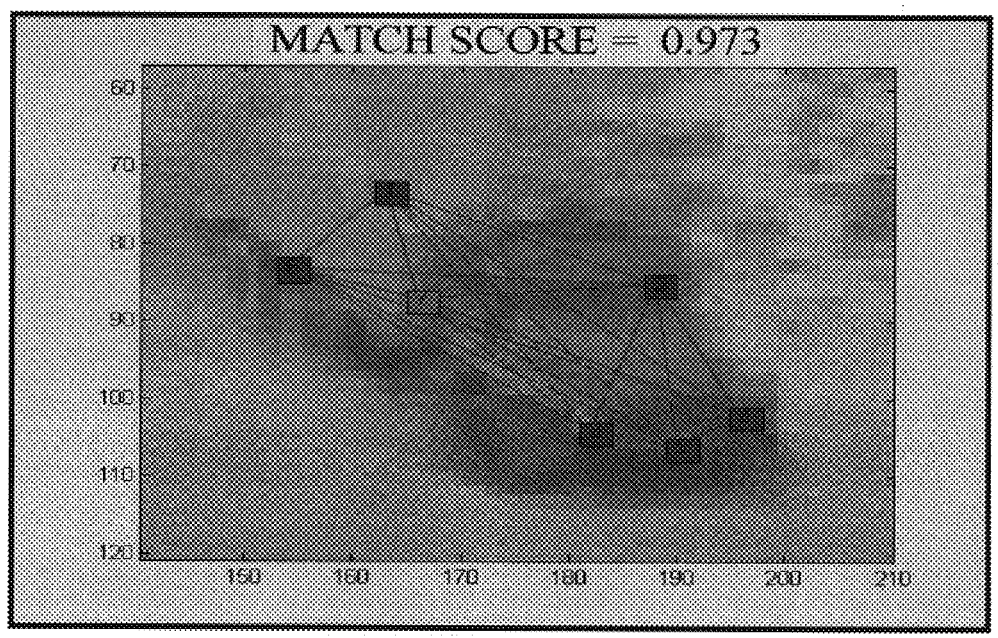
FIG. 20B illustrates a fuzzy graph matching result for the exemplary truck sequence; showing the learned fuzzy graph in frame #2 after matching with frame #1.
Figure 20C:
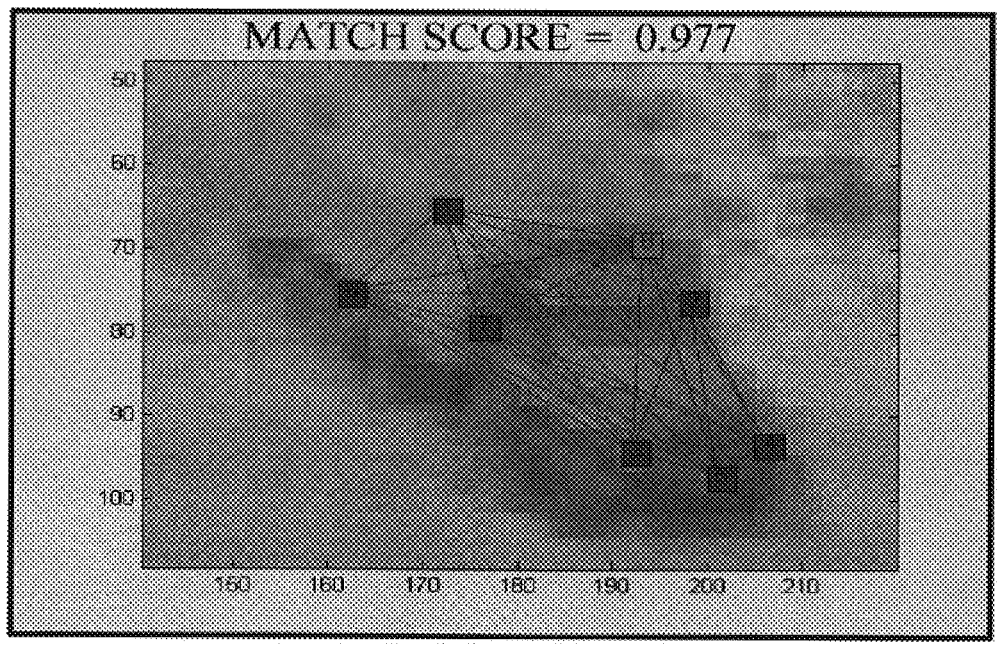
FIG. 20C illustrates a fuzzy graph matching result for the truck exemplary sequence, showing the learned fuzzy graph in frame #3 after matching with frame #2.
Figure 20D:
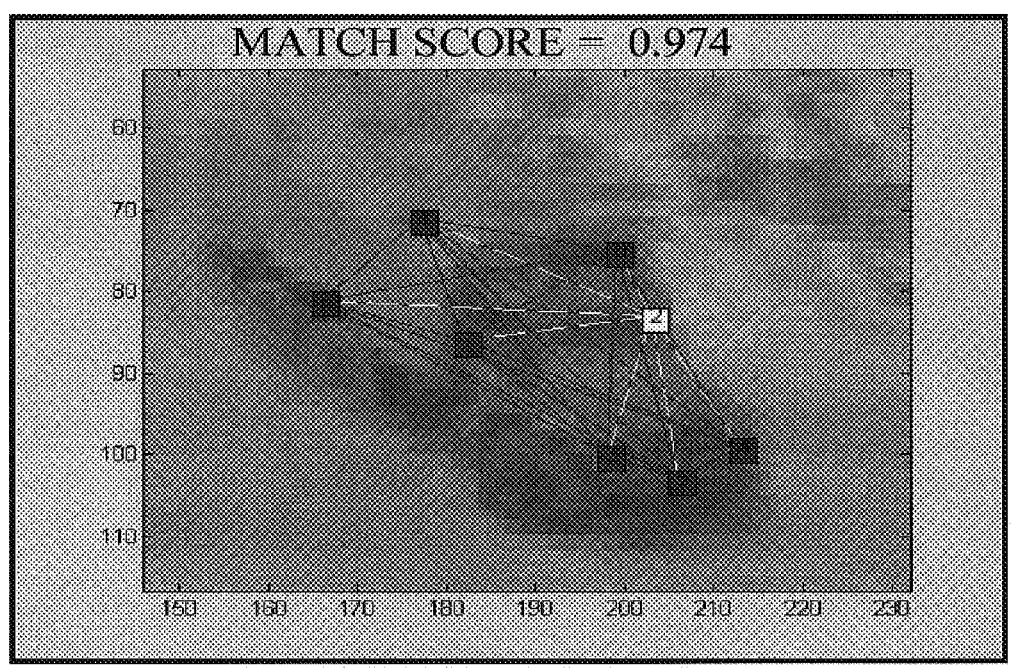
FIG. 20D illustrates a fuzzy graph matching result for the exemplary truck sequence, showing the learned fuzzy graph in frame #4 after matching with frame #3.

The fuzzy graph matching process is illustrated in FIG. 18. Matches with high compatibility scores represent the updated fuzzy graph in the second frame. The matched fuzzy graph is shown in red and the newly recruited node is shown in green. Additionally, the node properties for the matched nodes of the fuzzy graph are learned. Similarly, the edge properties of the fuzzy graph are also updated. In this embodiment, the system computes the average of the node and edge properties for the matching nodes as the update scheme. The system can be generalized using incremental learning schemes such as the M-PROBART.

There are two notable situations that may occur during the matching process. The first being that the object may have undergone geometric transformations, while the second is potential object occlusion.

During the matching process, the object may have undergone geometric transformations such as a scale change or a view change and, therefore the fuzzy graph may not obtain a match for all of its member nodes in any given view. However, another result of the fuzzy graph approach is that partial or sub-graph matching is allowed and hence can be used to measure the quality of the fingerprint. Sub-graph matching is also used as a cue by the present invention to recruit new points into the graph to account for the geometric transformation.

The second possibility is that the object may become partially occluded. In this case, the object can still be fingerprinted based on partial matching like before. However, unlike before, it would not be ideal to recruit high-energy points on the occluding object. Because the system may encode a few nodes in the process of building a complete fingerprint model for an object, weighting the nodes that result in matches over longer periods of time will suppress the nodes that do not match on a consistent basis over a large number of frames. This can be readily incorporated into the matching process by assigning a frequency or weight term for each node of the fuzzy graph into the objective function (i.e., equation (1)).

FIGS. 19A-19D illustrate the results of how a fingerprint model evolves for the tank sequence. This example illustrates five frames and how the fuzzy graph evolves over the five frames (i.e., FIG. 15, and FIGS. 19A-D). All matched nodes of the graph are marked in blue and are assigned the same node number as in the previous frame. FIGS. 19A-19D also illustrate that new points (marked in green) are recruited and then get matched in subsequent frames. Also, some of the graph nodes do not match and in such a case the unmatched node (shown in yellow) is not used in the matching process but is still stored for fingerprinting. In this example, the main geometric transformations are scale change due to the movement of the UAV camera during the capture of the video, as well as translation of the tank due to the tank and UAV motion. The matching scores between consecutive frames are shown in each of FIGS. 19A-19D. The matching scores are consistently high, indicating good matches.

The second example illustrates the fingerprinting process for a truck. FIGS. 20A-20D illustrate the evolution of the fingerprinting process for the truck, where the truck undergoes translation and a 3D rotation during the sequence. The matching scores between consecutive frames are shown in FIG. 20 and are also consistently high, indicating good matches.

Figure 21:
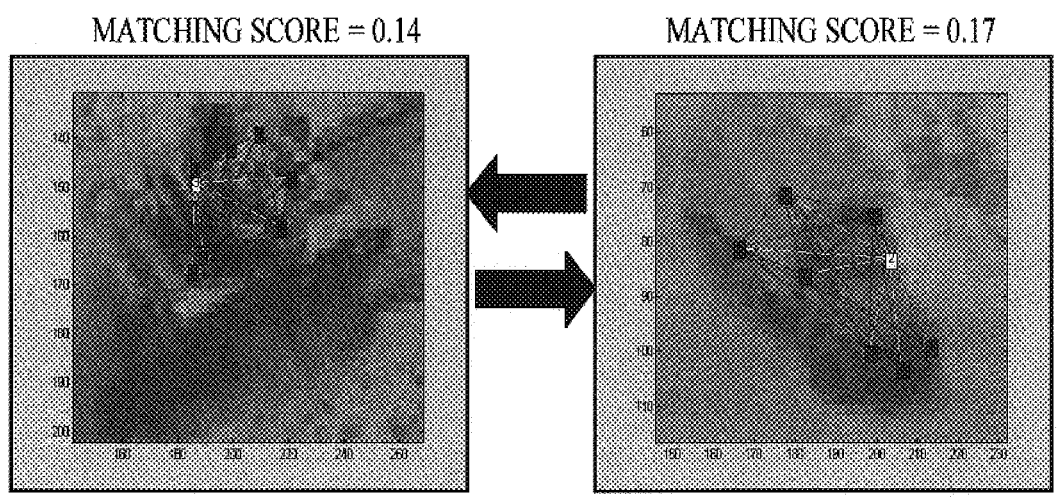
FIG. 21 illustrates graphs matching the truck fuzzy graph with the tank fuzzy graph.

Three tests were performed in order to test the quality of the fingerprint models built for the truck and the tank. In the first test, as shown in FIG. 21, the matching scores were computed when placing the fuzzy graph of the tank on the truck, and vice versa. As shown, the low matching scores indicate that these fingerprint models for the two objects are unique and robust.

Figure 22:
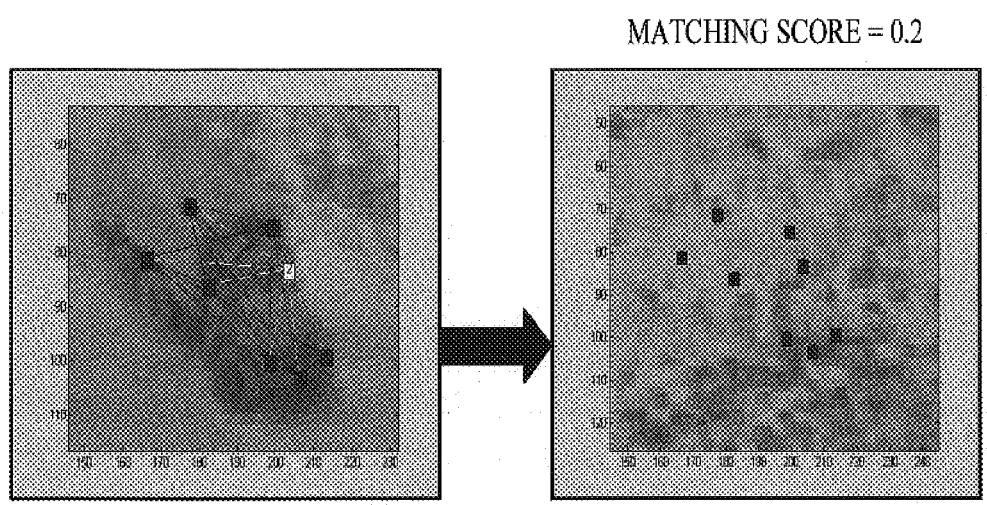
FIG. 22 illustrates graphs matching the truck fuzzy graph with desert terrain.

FIG. 22 illustrates another test, where the fuzzy graph of the truck is placed against points on the dessert terrain assuming the same structural relationships between the nodes of the fuzzy graph as the truck. As expected, the matching score was found to be low.

Figure 23:
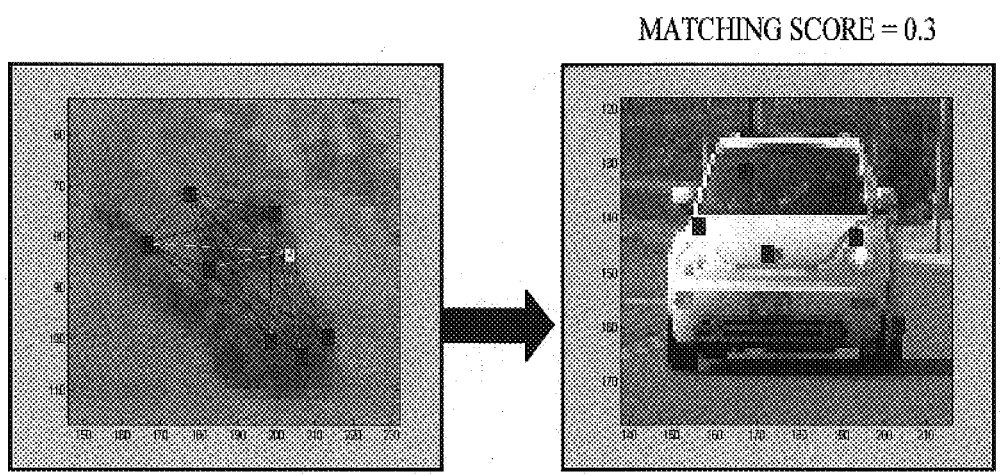
FIG. 23 illustrates graphs matching the truck fuzzy graph with a car.

Another exemplary test is shown in FIG. 23. In FIG. 23, the fuzzy graph of the truck is matched against a Volkswagen car, resulting in another poor match. Because it is highly unlikely that the terrain or the car would have the same spatial structure as the fuzzy graph of the truck, node properties were matched. Even then, the matching still resulted in a low score indicating, both the robustness and uniqueness of the fingerprint models.

What is claimed is:

1. An active learning system for fingerprinting an object in an image frame, comprising:
   one or more processors that include:
   an oriented localized filter module being configured to extract local features from a potential object candidate within the image frame by receiving an object model of the object candidate and computing points on the object from different views to form a feature vector at each computed point;
   a learning-feature graph-fingerprinting module configured to receive the local features and build a fingerprint of the object for tracking the object; and
   an object graph prototype module for receiving, storing, and transmitting object fingerprint information to the learning-feature graph-fingerprinting module to be updated as new features are received.

2. An active learning system as set forth in claim 1, further comprising:
   a flow-based object segmentation module for segmenting a potential object candidate from a sequence of video frames taken from a scene, and communicating the segmented potential object candidate to the oriented localized filter module for iconic feature extraction; and
   an incremental learning module for predicting a general class of the potential object candidate.

3. An active learning system as set forth in claim 2, further comprising:
   a fixed-basis function decomposition module using Haar wavelets to extract a relevant feature set from the potential object candidate;
   a static classifier for initial or temporary classification of the potential object candidate, thereby generating a classification category selected from a group consisting of a positive identification, a negative identification, a false positive identification, and a false negative identification, and where upon classification, the static classifier communicates the classification to the incremental learning module.

4. An active learning system as set forth in claim 3, wherein the feature vector is based on local intensity variations present in an image region around the point as seen from a given view, such that a number of points that form the object model is selected based on local photometric energy at each point, with the point being retained as an actual object point if its photometric energy is greater than a threshold where the threshold is computed based on the photometric energy associated with points within the image region.

5. An active learning system as set forth in claim 3, wherein the learning-feature graph-fingerprinting module forms a fuzzy graphical model (FGM) of object candidates to fingerprint the object by representing three-dimensional (3D) spatial relationships between salient object points and corresponding two-dimensional (2D) view-dependent feature vectors.

6. An active learning system as set forth in claim 5, wherein the FGM utilizes an algorithm for sub-graph matching to minimize an objective function, wherein the objective function is defined by:

$$J(U, C) = \sum_{i=1}^{n+1}\sum_{j=1}^{m+1} u_{ij}^2 f(c_{ij}) + \eta \sum_{i=1}^{n+1}\sum_{j=1}^{m+1} u_{ij}(1 - u_{ij}),$$

where:

n is a constant that controls the relative influence of the two terms in the minimization process;

$c_{ij}$ represents the absolute compatibility between nodes f in a graph A (i.e., graph A is a stored graph representing a candidate object) and j in a second graph (i.e., graph B represents an input object that is matched against graph A) (given the fuzzy assignments U), taking into account the attributes of the edges incident on nodes i and j and those of the neighboring nodes of i and j;

$C = [c_{ij}]$ is a compatibility matrix;

$u_{ij}$ is an element of an assignment matrix U, representing a degree to which node i in graph A matched node j in graph B;

n and m are the number of nodes in graphs A and B respectively;

function f( ) is similar to a distance function and takes on high values if $c_{ij}$ is low and vice versa;

compatibilities $c_{ij}$ depend on U;

assignments U depend on the compatibilities C; and where U and C are updated in an alternating fashion, giving rise to a relaxation process.

7. An active learning system as set forth in claim 5, wherein after the fuzzy graph model is formed, the system is configured to initiate visual tracking and track an object candidate through:

target state representation, where FGM features are hypothesized for the object candidate;

observation representation, where FGM features for the object candidate are identified in a current frame and assigned to the object candidate;

hypotheses measurement, where the features from the observation representation and target state representation are evaluated for matching properties using sub-graph matching;

hypotheses generation, where new hypothesized FGM features are formed based on the old estimation of the target state representation and old observation representation, thereby providing a dynamic tracking process.

8. An active learning system as set forth in claim 3, wherein the flow-based object segmentation module is configured to:

receive an input video sequence consisting of a sequence of frames; compute points to track from the video sequence using a Harris corner detector;

compute an optical flow from the points by utilizing a Lucas Kanade approach in which a pyramid of the input sequence of frames is created to compute a two-dimensional (2D) optical flow field consisting of rows or columns at different levels using a fixed size neighborhood, where flow computed at coarser levels is then propagated to finer resolution levels;

generate a 2D flow histogram image by converting each row or column of the 2D optical flow field into a one-dimensional (1D) flow histogram and stacking the flow histograms row-wise or column-wise;

post-process the flow histogram image by utilizing a modified median filter on the flow histogram image to eliminate isolated non-zero bins;

detect background flow from the flow histogram using a Hough transform; estimate object dimensions from the flow histogram image using the Hough transform;

update the object dimension estimates by creating an average object dimension estimate as new object dimension estimates become available; and segment the object from the scene using the object dimension estimates, the segmented object being the object candidate in the form of an object model.

9. An active learning system as set forth in claim 3, wherein the incremental learning module includes a learning-based cascaded classifier framework for predicting the general class of an object, the cascaded classifier including a pre-learning cascade and a post-learning cascade, wherein the pre-learning cascade includes a front-end multi-layer back-propagation neural network and an initial back-end incremental learning algorithm, and wherein the post-learning cascade includes the multi-layer back-propagation neural network and an updated incremental learning algorithm.

10. An active learning system as set forth in claim 9, wherein the multi-layer back-propagation neural network is a Non-linear Discriminant Analysis (NDA) classifier, and the back-end incremental learning algorithm is a Modified-Probabilistic Adaptive Resonance Theory (M-PROBART) classifier.

11. An active learning system as set forth in claim 3, wherein the fixed-basis function decomposition module is configured to learn a relevant feature set for a class of objects based on an example set of images, with the example set of images being transformed from image space to wavelet space utilizing an over-complete basis-set of Haar wavelets that respond to local intensity differences at a plurality of orientations and scales, where the wavelet space operates as the relevant feature set used to train the static classifier.

12. An active learning system as set forth in claim 3, wherein the fixed-basis function decomposition module is configured to transform the example set of images from image space to wavelet space through operations of:

computing a response of wavelet filters over an image, where at least three type of wavelets, vertical, horizontal, and diagonal, are computed at different scales by forming an inner-product (dot-product) of the wavelet basis function to provide wavelet coefficients, where the wavelet coefficients serve as the relevant feature set; and utilizing absolute values of the wavelet coefficients to eliminate differences in features when considering a dark object on light background and a light object on a dark background.

13. A computer program product for object fingerprinting, the computer program product comprising computer-readable instruction means encoded on a computer-readable medium for causing a computer to:

extract local features from a potential object candidate within the image frame using an oriented localized filter module to receive an object model of the object candidate and compute points on the object from different views to form a feature vector at each computed point;

receive the local features and build a fingerprint of the object for tracking the object using a learning-feature graph-fingerprinting module; and receive, store, and communicate object fingerprint information to the learning-feature graph-fingerprinting module to be updated as new features are received.

14. A computer program product as set forth in claim 13, further comprising computer-readable instruction means encoded on a computer-readable medium for causing a computer to:

segment a potential object candidate from a sequence of video frames taken from a scene using a flow-based object segmentation module, and communicating the segmented potential object candidate to the oriented localized filter module for iconic feature extraction; and predict a general class of the potential object candidate using a incremental learning module.

15. A computer program product as set forth in claim 14, further comprising computer-readable instruction means encoded on a computer-readable medium for causing a computer to:

extract a relevant feature set from the potential object candidate using a fixed-basis function decomposition module using Haar wavelets;

classify the potential object candidate using a static classifier, thereby generating a classification category selected from a group consisting of a positive identification, a negative identification, a false positive identification, and a false negative identification, and where upon classification, the static classifier communicates the classification to the incremental learning module.

16. A computer program product as set forth in claim 15, wherein the feature vector is based on local intensity variations present in an image region around the point as seen from a given view, such that a number of points that form the object model is selected based on local photometric energy at each point, with the point being retained as an actual object point if its photometric energy is greater than a threshold where the threshold is computed based on the photometric energy associated with points within the image region.

17. A computer program product as set forth in claim 15, wherein the learning-feature graph-fingerprinting module is configured to form a fuzzy graphical model (FGM) of object candidates to fingerprint the object by representing three-dimensional (3D) spatial relationships between salient object points and corresponding two-dimensional (2D) view-dependent feature vectors.

18. A computer program product as set forth in claim 17, wherein the FGM utilizes an algorithm for sub-graph matching to minimize an objective function, wherein the objective function is defined by:

$$J(U, C) = \sum_{i=1}^{n+1} \sum_{j=1}^{m+1} u_{ij}^2 f(c_{ij}) + \eta \sum_{i=1}^{n+1} \sum_{j=1}^{m+1} u_{ij}(1 - u_{ij}),$$

where:

n is a constant that controls the relative influence of the two terms in the minimization process;

$c_{ij}$ represents the absolute compatibility between nodes f in a graph A (i.e., graph A is a stored graph representing a candidate object) and j in a second graph (i.e., graph B represents an input object that is matched against graph A) (given the fuzzy assignments U), taking into account the attributes of the edges incident on nodes i and j and those of the neighboring nodes of i and j;

$C = [c_{ij}]$ is a compatibility matrix;

$u_{ij}$ is an element of an assignment matrix U, representing a degree to which node i in graph A matched node j in graph B;

n and m are the number of nodes in graphs A and B respectively;

function f( ) is similar to a distance function and takes on high values if $c_{ij}$ is low and vice versa;

compatibilities $c_{ij}$, depend on U;

assignments U depend on the compatibilities C, and where U and C are updated in an alternating fashion, giving rise to a relaxation process.

19. A computer program product as set forth in claim 17, wherein after the fuzzy graph model is formed, the computer program product is configured to initiate visual tracking and track an object candidate through:

target state representation, where FGM features are hypothesized for the object candidate;

observation representation, where FGM features for the object candidate are identified in a current frame and assigned to the object candidate;

hypotheses measurement, where the features from the observation representation and target state representation are evaluated for matching properties using sub-graph matching;

hypotheses generation, where new hypothesized FGM features are formed based on the old estimation of the target state representation and old observation representation, thereby providing a dynamic tracking process.

20. A computer program product as set forth in claim 15, wherein the flow-based object segmentation module is configured to:

receive an input video sequence consisting of a sequence of frames; compute points to track from the video sequence using a Harris corner detector;

compute an optical flow from the points by utilizing a Lucas Kanade approach in which a pyramid of the input sequence of frames is created to compute a two-dimensional (2D) optical flow field consisting of rows or columns at different levels using a fixed size neighborhood, where flow computed at coarser levels is then propagated to finer resolution levels;

generate a 2D flow histogram image by converting each row or column of the 2D optical flow field into a one-dimensional (1D) flow histogram and stacking the flow histograms row-wise or column-wise;

post-process the flow histogram image by utilizing a modified median filter on the flow histogram image to eliminate isolated non-zero bins;

detect background flow from the flow histogram using a Hough transform;

estimate object dimensions from the flow histogram image using the Hough transform;

update the object dimension estimates by creating an average object dimension estimate as new object dimension estimates become available; and segment the object from the scene using the object dimension estimates, the segmented object being the object candidate in the form of an object model.

21. A computer program product as set forth in claim 15, wherein the incremental learning module includes a learning-based cascaded classifier framework configured to predict the general class of an object, the cascaded classifier including a pre-learning cascade and a post-learning cascade, wherein the pre-learning cascade includes a front-end multi-layer back-propagation neural network and an initial back-end incremental learning algorithm, and wherein the post-learning cascade includes the multi-layer back-propagation neural network and an updated incremental learning algorithm.

22. A computer program product as set forth in claim 21, wherein the multi-layer back-propagation neural network is a Non-linear Discriminant Analysis (NDA) classifier, and the back-end incremental learning algorithm is a Modified-Probabilistic Adaptive Resonance Theory (M-PROBART) classifier.

23. A computer program product as set forth in claim 15, wherein the fixed-basis function decomposition module is configured to learn a relevant feature set for a class of objects based on an example set of images, with the example set of images being transformed from image space to wavelet space utilizing an over-complete basis-set of Haar wavelets that respond to local intensity differences at a plurality of orientations and scales, where the wavelet space operates as the relevant feature set used to train the static classifier.

24. A computer program product as set forth in claim 15, wherein the fixed-basis function decomposition module is configured to transform the example set of images from image space to wavelet space through operations of:
computing a response of wavelet filters over an image, where at least three type of wavelets, vertical, horizontal, and diagonal, are computed at different scales by forming an inner-product (dot-product) of the wavelet basis function to provide wavelet coefficients, where the wavelet coefficients serve as the relevant feature set; and
utilizing absolute values of the wavelet coefficients to eliminate differences in features when considering a dark object on light background and a light object on a dark background.

25. A method for object fingerprinting, the method comprising acts of:
using one or more processors to perform operations of:
extracting local features from a potential object candidate within the image frame using an oriented localized filter module to receive an object model of the object candidate and compute points on the object from different views to form a feature vector at each computed point;
receiving the local features and building a fingerprint of the object for tracking the object using a learning-feature graph-fingerprinting module; and
receiving, storing, and communicating object fingerprint information to the learning-feature graph-fingerprinting module to be updated as new features are received.

26. A method for object fingerprinting as set forth in claim 25, further comprising acts of:
segmenting a potential object candidate from a sequence of video frames taken from a scene using a flow-based object segmentation module, and communicating the segmented potential object candidate to the oriented localized filter module for iconic feature extraction; and
predicting a general class of the potential object candidate using a incremental learning module.

27. A method for object fingerprinting as set forth in claim 26, further comprising acts of:
extracting a relevant feature set from the potential object candidate using a fixed-basis function decomposition module using Haar wavelets;
classifying the potential object candidate using a static classifier, thereby generating a classification category selected from a group consisting of a positive identification, a negative identification, a false positive identification, and a false negative identification, and where upon classification, the static classifier communicates the classification to the incremental learning module.

28. A method for object fingerprinting as set forth in claim 27, wherein in the act of extracting features from a potential object candidate within the image frame using an oriented localized filter module, the feature vector is based on local intensity variations present in an image region around the point as seen from a given view, such that a number of points that form the object model is selected based on local photometric energy at each point, with the point being retained as an actual object point if its photometric energy is greater than a threshold where the threshold is computed based on the photometric energy associated with points within the image region.

29. A method for object fingerprinting as set forth in claim 27, wherein in the acts of receiving the features and building a fingerprint of the object for tracking the object using a learning-feature graph-fingerprinting module, the learning-feature graph-fingerprinting module is configured to form a fuzzy graphical model (FGM) of object candidates to fingerprint the object by representing three-dimensional (3D) spatial relationships between salient object points and corresponding two-dimensional (2D) view-dependent feature vectors.

30. A method for object fingerprinting as set forth in claim 29, wherein the FGM utilizes an algorithm for sub-graph matching to minimize an objective function, wherein the objective function is defined by:

$$J(U, C) = \sum_{i=1}^{n+1}\sum_{j=1}^{m+1} u_{ij}^2 f(c_{ij}) + \eta \sum_{i=1}^{n+1}\sum_{j=1}^{m+1} u_{ij}(1 - u_{ij}),$$

where:
n is a constant that controls the relative influence of the two terms in the minimization process;
$c_{ij}$ represents the absolute compatibility between nodes f in a graph A (i.e., graph A is a stored graph representing a candidate object) and j in a second graph (i.e., graph B represents an input object that is matched against graph A) (given the fuzzy assignments U), taking into account the attributes of the edges incident on nodes i and j and those of the neighboring nodes of i and j;
$C = [c_{ij}]$ is a compatibility matrix;
$u_{ij}$ is an element of an assignment matrix U, representing a degree to which node i in graph A matched node j in graph B;
n and m are the number of nodes in graphs A and B respectively; function f( ) is similar to a distance function and takes on high values if $c_{ij}$ is low and vice versa; compatibilities $c_{ij}$ depend on U;
assignments U depend on the compatibilities C; and
where U and C are updated in an alternating fashion, giving rise to a relaxation process.

31. A method for object fingerprinting as set forth in claim 29, wherein after the fuzzy graph model is formed, the method further comprises an act of initiating visual tracking and tracking an object candidate through acts of:
hypothesizing FGM features for the object candidate;
identifying FGM features for the object candidate in a current frame;
evaluating matching properties for the hypothesized features and the identified features using sub-graph matching;
forming new hypothesized FGM features based on the previously hypothesized features and the previously identified features, thereby providing a dynamic tracking process.

32. A method for object fingerprinting as set forth in claim 27, wherein in the act of segmenting a potential object candidate from a sequence of video frames taken from a scene using a flow-based object segmentation module, the flow-based object segmentation module performs acts of:
receiving an input video sequence consisting of a sequence of frames;

computing points to track from the video sequence using a Harris corner detector;

computing an optical flow from the points by utilizing a Lucas Kanade approach in which a pyramid of the input sequence of frames is created to compute a two-dimensional (2D) optical flow field consisting of rows or columns at different levels using a fixed size neighborhood, where flow computed at coarser levels is then propagated to finer resolution levels;

generating a 2D flow histogram image by converting each row or column of the 2D optical flow field into a one-dimensional (1D) flow histogram and stacking the flow histograms row-wise or column-wise;

post-processing the flow histogram image by utilizing a modified median filter on the flow histogram image to eliminate isolated non-zero bins;

detecting background flow from the flow histogram using a Hough transform;

estimating object dimensions from the flow histogram image using the Hough transform;

updating the object dimension estimates by creating an average object dimension estimate as new object dimension estimates become available; and segmenting the object from the scene using the object dimension estimates, the segmented object being the object candidate in the form of an object model.

33. A method for object fingerprinting as set forth in claim 27, wherein in the act of predicting a general class of the potential object candidate using a incremental learning module, the incremental learning module includes a learning-based cascaded classifier framework configured to perform and act of predicting the general class of an object, the cascaded classifier including a pre-learning cascade and a post-learning cascade, wherein the pre-learning cascade includes a front-end multi-layer back-propagation neural network and an initial back-end incremental learning algorithm, and wherein the post-learning cascade includes the multi-layer back-propagation neural network and an updated incremental Teaming algorithm.

34. A method for object fingerprinting as set forth in claim 33, wherein the multi-layer back-propagation neural network is a Non-linear Discriminant Analysis (NDA) classifier, and the back-end incremental learning algorithm is a Modified-Probabilistic Adaptive Resonance Theory (M-PROBART) classifier.

35. A method for object fingerprinting as set forth in claim 27, wherein in the act of extracting a relevant feature set from the potential object candidate using a fixed-basis function decomposition module, the fixed-basis function decomposition module is configured to perform an act of learning a relevant feature set for a class of objects based on an example set of images, with the example set of images being transformed from image space to wavelet space utilizing an over-complete basis-set of Haar wavelets that respond to local intensity differences at a plurality of orientations and scales, where the wavelet space operates as the relevant feature set used to train the static classifier.

36. An active learning system for fingerprinting an object in an image frame, comprising:

one or more processors that include:

a flow-based object segmentation module for segmenting a potential object candidate from a sequence of video frames taken from a scene, and communicating the segmented potential object candidate to an oriented localized filter module for iconic feature extraction, where features are extracted from the potential object candidate within the image frame by receiving an object model of the object candidate and computing points on the object from different views to form a feature vector at each computed point;

a fixed-basis function decomposition module using Haar wavelets to extract a relevant feature set from the potential object candidate;

a static classifier for initial/temporary classification of the potential object candidate, where the static classifier is trained on the feature set of desirable object examples and non-object examples, thereby generating a classification category selected from a group consisting of a positive identification, a negative identification, a false positive identification, and a false negative identification, and where upon classification, the static classifier transmits the classification to the incremental learning module;

an incremental learning module for predicting a general class of the potential object candidate;

an oriented localized filter module being configured to extract iconic features from the segmented potential object candidate, the iconic features being in a form of a feature vector comprising n elements with responses of in oriented basis filters at k different scales;

a learning-feature graph-fingerprinting module configured to receive the iconic features and build a fingerprint of the object for tracking the object; and an object graph prototype module for receiving, storing, and transmitting object fingerprint information to the learning-feature graph-fingerprinting module to be updated as new iconic features are received.

* * * * *